United States Patent
Takaoka

(10) Patent No.: US 10,257,129 B2
(45) Date of Patent: Apr. 9, 2019

(54) INFORMATION PROCESSING APPARATUS, INFORMATION PROCESSING METHOD, PROGRAM, RECORDING MEDIUM, AND INFORMATION PROCESSING SYSTEM FOR SELECTING AN INFORMATION POSTER AND DISPLAYING A VIEW IMAGE OF THE SELECTED INFORMATION POSTER

(71) Applicant: SONY CORPORATION, Tokyo (JP)

(72) Inventor: Tomohisa Takaoka, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 21 days.

(21) Appl. No.: 15/371,956

(22) Filed: Dec. 7, 2016

(65) Prior Publication Data
US 2017/0093763 A1 Mar. 30, 2017

Related U.S. Application Data

(63) Continuation of application No. 13/592,735, filed on Aug. 23, 2012, now Pat. No. 9,538,021.

(30) Foreign Application Priority Data

Sep. 2, 2011 (JP) .................... 2011-191483

(51) Int. Cl.
*H04N 7/00* (2011.01)
*H04N 7/18* (2006.01)
(Continued)

(52) U.S. Cl.
CPC ........ *H04L 51/04* (2013.01); *G06F 17/30247* (2013.01); *G06K 9/00228* (2013.01);
(Continued)

(58) Field of Classification Search
CPC ........ G06Q 30/02; G06Q 10/10; G06Q 30/00; G06Q 30/0207; G06Q 30/0261; G06Q 30/06; G06Q 30/0241; G06Q 30/0259; G06Q 30/0269; G06Q 30/0273; G06Q 30/04; G06F 17/30867; G06F 17/30041; G06F 17/30047; G06F 17/30241; G06F 17/30256; G06F 17/30265;
(Continued)

(56) References Cited

U.S. PATENT DOCUMENTS 7,702,624 B2 4/2010 King et al.
8,185,959 B2 * 5/2012 Bellwood ............... G06F 21/10
382/100
(Continued)

FOREIGN PATENT DOCUMENTS

JP 2008-48287 2/2008

*Primary Examiner* — Chia Wei A Chen
(74) *Attorney, Agent, or Firm* — Paratus Law Group, PLLC

(57) ABSTRACT

Provided is an information processing apparatus including an image acquisition unit for acquiring an image that includes a target a user is paying attention to, an access information acquisition unit for acquiring access information assigned with a time-limited access right to public information that is associated with the target in the image, a public information acquisition unit for acquiring the public information using the access information, and a display control unit for controlling display of the public information.

12 Claims, 25 Drawing Sheets

(51) Int. Cl.
*H04N 21/2743* (2011.01)
*H04N 5/232* (2006.01)
*H04L 12/58* (2006.01)
*H04N 21/258* (2011.01)
*H04N 21/422* (2011.01)
*H04N 21/4223* (2011.01)
*H04N 21/4788* (2011.01)
*H04N 1/00* (2006.01)
*G06F 17/30* (2006.01)
*G06K 9/00* (2006.01)
*H04W 12/02* (2009.01)

(52) U.S. Cl.
CPC .......... *G06K 9/00671* (2013.01); *H04L 51/20* (2013.01); *H04L 51/38* (2013.01); *H04N 1/00244* (2013.01); *H04N 1/00323* (2013.01); *H04N 21/25841* (2013.01); *H04N 21/4223* (2013.01); *H04N 21/42202* (2013.01); *H04N 21/4788* (2013.01); *H04W 12/02* (2013.01); *H04N 2201/0084* (2013.01); *H04N 2201/3253* (2013.01); *H04N 2201/3278* (2013.01)

(58) Field of Classification Search
CPC ......... G06F 17/30528; G06F 17/30864; G06F 17/3087; G06F 17/30873; G06F 21/10; G06F 3/012; G06F 3/013; G06F 3/017; G01C 21/3679; G06K 9/22; G06K 9/00711; G06K 9/00671; H04N 1/00307; H04N 5/23219; H04N 5/272; H04N 7/181; H04N 21/4126; H04N 21/4788; H04N 13/194; H04N 1/00244; H04N 21/00–21/8586; A63F 13/213
See application file for complete search history.

(56) References Cited

U.S. PATENT DOCUMENTS

| | | | |
|---|---|---|---|
| 8,260,543 B2 | 9/2012 | Han | |
| 8,474,704 B1* | 7/2013 | Grimm | G07F 19/207 235/379 |
| 8,515,816 B2 | 8/2013 | King et al. | |
| 8,634,712 B1* | 1/2014 | Mullins | H04N 21/6156 348/14.02 |
| 9,094,543 B2* | 7/2015 | Mullins | H04N 21/6156 |
| 9,143,739 B2* | 9/2015 | Murphy | H04N 7/18 |
| 9,420,250 B2* | 8/2016 | Laganiere | H04L 12/6418 |
| 2003/0182055 A1 | 9/2003 | Curatolo et al. | |
| 2004/0254868 A1 | 12/2004 | Kirkland et al. | |
| 2005/0136912 A1 | 6/2005 | Curatolo et al. | |
| 2008/0298386 A1 | 12/2008 | Fiatal | |
| 2009/0165140 A1 | 6/2009 | Robinson et al. | |
| 2009/0174778 A1 | 7/2009 | Allen et al. | |
| 2009/0217343 A1* | 8/2009 | Bellwood | G06F 21/10 726/1 |
| 2010/0030578 A1 | 2/2010 | Siddique et al. | |
| 2010/0062794 A1 | 3/2010 | Han | |
| 2011/0010308 A1 | 1/2011 | Primus et al. | |
| 2011/0082746 A1 | 4/2011 | Rice et al. | |
| 2011/0093361 A1* | 4/2011 | Morales | G06Q 10/087 705/26.62 |
| 2011/0102459 A1 | 5/2011 | Hall | |
| 2011/0115623 A1 | 5/2011 | Gnanasekaran et al. | |
| 2011/0212717 A1 | 9/2011 | Rhoads et al. | |
| 2011/0258049 A1 | 10/2011 | Ramer et al. | |
| 2011/0289537 A1* | 11/2011 | Buehl | H04N 21/4223 725/98 |
| 2011/0302152 A1 | 12/2011 | Boyd et al. | |
| 2011/0317022 A1* | 12/2011 | Cao | H04N 5/232 348/207.11 |
| 2012/0001831 A1 | 1/2012 | Smith et al. | |
| 2012/0004956 A1 | 1/2012 | Huston et al. | |
| 2012/0050324 A1 | 3/2012 | Jeong et al. | |
| 2012/0059848 A1 | 3/2012 | Krishnamoorthy | |
| 2012/0066573 A1* | 3/2012 | Berger | H04N 1/00196 715/202 |
| 2012/0096403 A1 | 4/2012 | Jung et al. | |
| 2012/0105440 A1 | 5/2012 | Lieberman et al. | |
| 2012/0105475 A1 | 5/2012 | Tseng | |
| 2012/0115513 A1 | 5/2012 | Han | |
| 2012/0122570 A1 | 5/2012 | Baronoff | |
| 2012/0209907 A1 | 8/2012 | Andrews et al. | |
| 2012/0231839 A1 | 9/2012 | Seo et al. | |
| 2012/0242865 A1 | 9/2012 | Vartanian et al. | |
| 2012/0284203 A1 | 11/2012 | Kivirauma et al. | |
| 2012/0284290 A1 | 11/2012 | Keebler et al. | |
| 2012/0290591 A1 | 11/2012 | Flynn et al. | |
| 2012/0293547 A1 | 11/2012 | Bai et al. | |
| 2013/0006760 A1 | 1/2013 | Brenner | |
| 2013/0007668 A1 | 1/2013 | Liu et al. | |
| 2013/0046624 A1 | 2/2013 | Calman et al. | |
| 2013/0069986 A1 | 3/2013 | Fock et al. | |
| 2013/0073988 A1 | 3/2013 | Groten et al. | |
| 2013/0127980 A1 | 5/2013 | Haddick et al. | |
| 2013/0145024 A1 | 6/2013 | Cao et al. | |
| 2013/0254900 A1 | 9/2013 | Sathish et al. | |
| 2014/0036064 A1 | 2/2014 | Lu et al. | |
| 2014/0080428 A1 | 3/2014 | Rhoads et al. | |
| 2016/0292509 A1* | 10/2016 | Kaps | G06K 9/00718 |
| 2016/0292881 A1* | 10/2016 | Bose | G06K 9/00342 |

* cited by examiner

FIG. 15
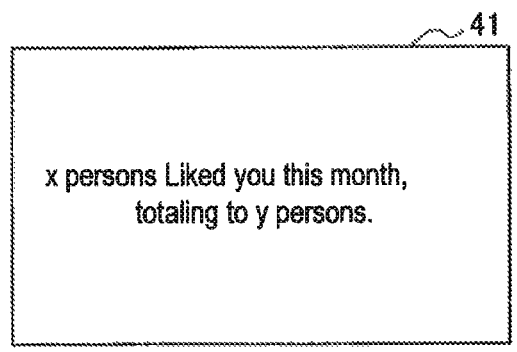
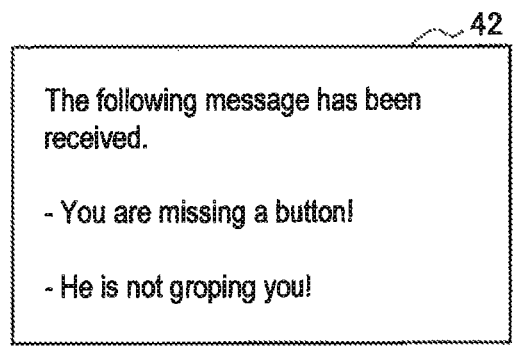

INFORMATION PROCESSING APPARATUS, INFORMATION PROCESSING METHOD, PROGRAM, RECORDING MEDIUM, AND INFORMATION PROCESSING SYSTEM FOR SELECTING AN INFORMATION POSTER AND DISPLAYING A VIEW IMAGE OF THE SELECTED INFORMATION POSTER

CROSS-REFERENCE TO PRIOR APPLICATION

This application is a continuation of U.S. patent application Ser. No. 13/592,735 (filed on Aug. 23, 2012), which claims priority to Japanese Patent Application No. 2011-191483 (filed on Sep. 2, 2011), which are all hereby incorporated by reference in their entirety.

BACKGROUND

The present disclosure relates to an information processing apparatus, an information processing method, a program, a recording medium, and an information processing system.

In recent years, modes of communication on the Internet are becoming increasingly diverse. With the diversification of the modes of communication, integration of communication in the real world and communication on the Internet has been proposed. For example, JP 2008-48287A discloses a system that supports promotion of communication in the real world by issuing a notification, using friend information on a social network service (SNS), in a case a person who is linked through a friend is nearby in the real world.

SUMMARY

As described above, efforts to support promotion of communication in the real world by the integration of communication on the Internet and communication in the real world have been made comparatively actively. However, there may potentially be needs to use communication on the Internet in the real world while maintaining anonymity.

Thus, the present disclosure proposes an information processing apparatus, an information processing method, a program, a recording medium, and an information processing system which are novel and improved, and which enable communication on the Internet with a target one is paying attention to in the real world while maintaining anonymity.

According to the present disclosure, there is provided an information processing apparatus which includes an image acquisition unit for acquiring an image that includes a target a user is paying attention to, an access information acquisition unit for acquiring access information assigned with a time-limited access right to public information that is associated with the target in the image, a public information acquisition unit for acquiring the public information using the access information, and a display control unit for controlling display of the public information.

Also, according to the present disclosure, there is provided an information processing method which includes acquiring an image that includes a target a user is paying attention to, acquiring access information assigned with a time-limited access right to public information that is associated with the target in the image, acquiring the public information using the access information, and controlling display of the public information.

Further, according to the present disclosure, there is provided a program for causing a computer to function as an information processing apparatus including an image acquisition unit for acquiring an image that includes a target a user is paying attention to, an access information acquisition unit for acquiring access information assigned with a time-limited access right to public information that is associated with the target in the image, a public information acquisition unit for acquiring the public information using the access information, and a display control unit for controlling display of the public information.

Further, according to the present disclosure, there is provided a computer-readable recording medium storing a program for causing a computer to function as an information processing apparatus including an image acquisition unit for acquiring an image that includes a target a user is paying attention to, an access information acquisition unit for acquiring access information assigned with a time-limited access right to public information that is associated with the target in the image, a public information acquisition unit for acquiring the public information using the access information, and a display control unit for controlling display of the public information.

Further, according to the present disclosure, there is provided an information processing system which includes an information processing apparatus including an image acquisition unit for acquiring an image that includes a target a user is paying attention to, an access information acquisition unit for acquiring access information assigned with a time-limited access right to public information that is associated with the target in the image, a public information acquisition unit for acquiring the public information using the access information, and a display control unit for controlling display of the public information, a position sharing server for providing the information processing apparatus with the access information to the public information that is associated with the target specified based on position information, and a public information providing server for providing the public information in response to an access from the user who has the time-limited access right.

As described above, according to the present disclosure, communication on the Internet with a target one is paying attention to in the real world can be performed while maintaining anonymity.

BRIEF DESCRIPTION OF THE DRAWINGS

FIG. 15 is an explanatory diagram showing an example of an action notification according to the embodiment;

DETAILED DESCRIPTION OF THE EMBODIMENT(S)

Figure 1:
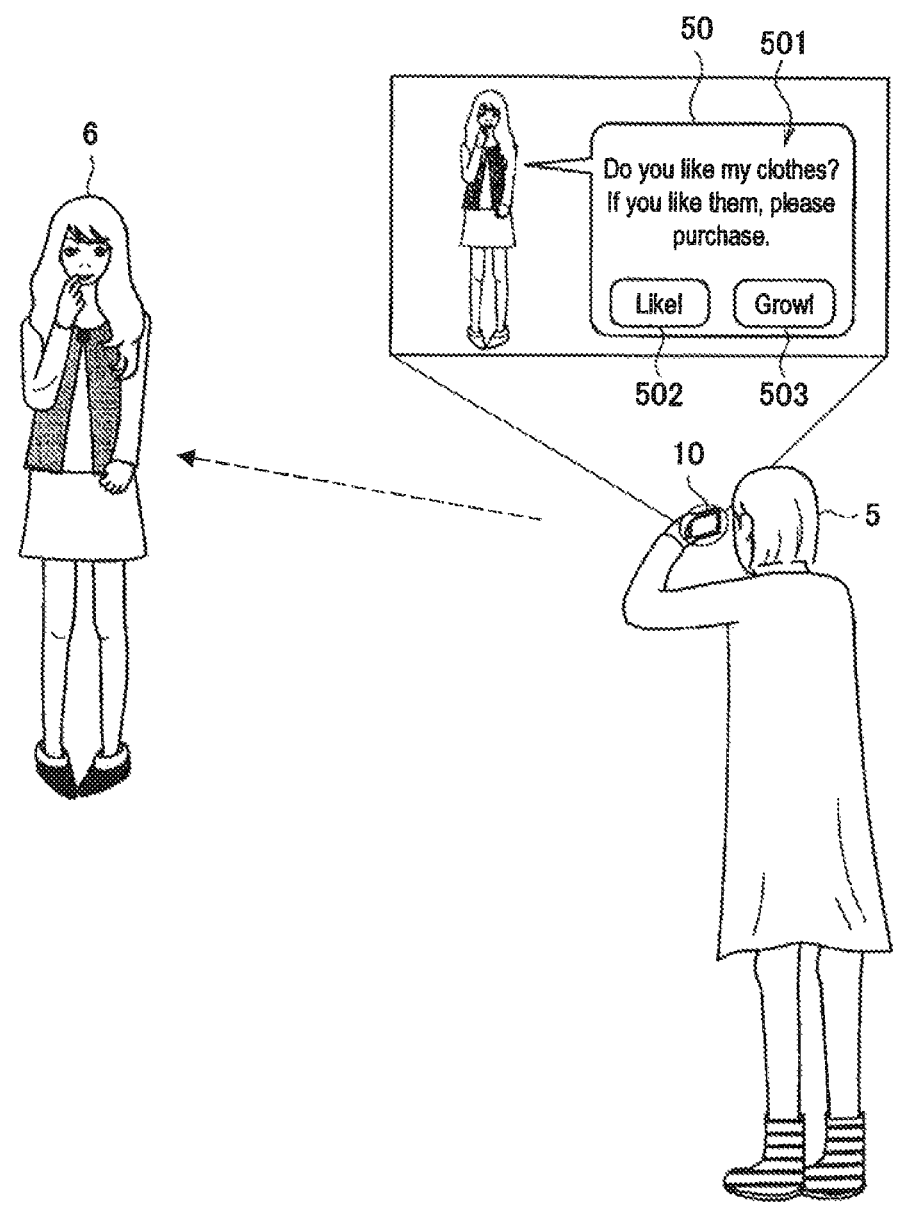
FIG. 1 is an explanatory diagram describing an overview of a communication system according to an embodiment of the present disclosure.

Hereinafter, preferred embodiments of the present disclosure will be described in detail with reference to the appended drawings. Note that, in this specification and the appended drawings, structural elements that have substantially the same function and configuration are denoted with the same reference numerals, and repeated explanation of these structural elements is omitted.

Additionally, the explanation will be given in the following order.

1. Overview
2. First Embodiment (Example of Access Information Acquisition Based on Position Information)
   2-1. System Configuration
   2-2. Functional Configuration of User Device
   2-3. Example Hardware Configuration of User Device
   2-4. Functional Configuration of Position Sharing Server
   2-5. Functional Configuration of Public Information Server
   2-6. Example Operation
3. Second Embodiment (Example of Access Information Acquisition Based on Position Information and View Information)
   3-1. System Configuration
   3-2. Functional Configuration of User Device
   3-3. Functional Configuration of Position/View Sharing Server
   3-4. Example Operation
4. Third Embodiment (Example of Information Poster Sending Out Access Information)
   4-1. System Configuration
   4-2. Functional Configuration of User Device
   4-3. Example Operation
5. Personal Information
6. Example of Effect

1. Overview

First, an overview of a communication system according to each embodiment of the present disclosure will be described with reference to FIG. 1. FIG. 1 is an explanatory diagram describing an overview of a communication system according to an embodiment of the present disclosure.

As described above, the present disclosure discloses a communication system that specifies a target person in front of a user in the real world and supports anonymous and one-time communication with the specified person.

A specific example of user experience that can be realized using this communication system will be described here. As shown in FIG. 1, a user 5 activates, on the street, for example, a specific application installed on a user device 10 that the user 5 possesses and turns the user device 10 toward a target person 6. Then, an image including the target person 6 is displayed on a screen of the user device 10, and public information 50 posted in advance by the target person 6 is displayed on the image.

Normally, people do not communicate with a person they see on the street unless they have a chance to talk to him/her. However, using the communication system of the present disclosure, the user 5 can access information posted on the Internet by a specific target person 6 in front of the user 5. This public information may be a message that the information poster has input in advance, for example. Or, the public information may include a reception area for receiving an action from a person who has accessed this public information. Details of the public information will be given later.

As described above, the communication system of the present disclosure enables communication, on the Internet, between a user and a specific target person 6 who is actually in front of the user. Additionally, this communication is performed anonymously. Thus, privacy should be given great consideration. For example, access to the public information is preferably allowed only for a predetermined time from the actual specification of the target person 6 so that the specified target person 6 will not be tracked down. For example, an access ID may be changed so as to prevent tracking down of the specific target person 6.

In the following, the communication system of the present disclosure will be described taking as examples a plurality of embodiments with different specification methods of a target person.

2. First Embodiment (Example of Access Information Acquisition Based on Position Information)

2-1. System Configuration

Figure 2:
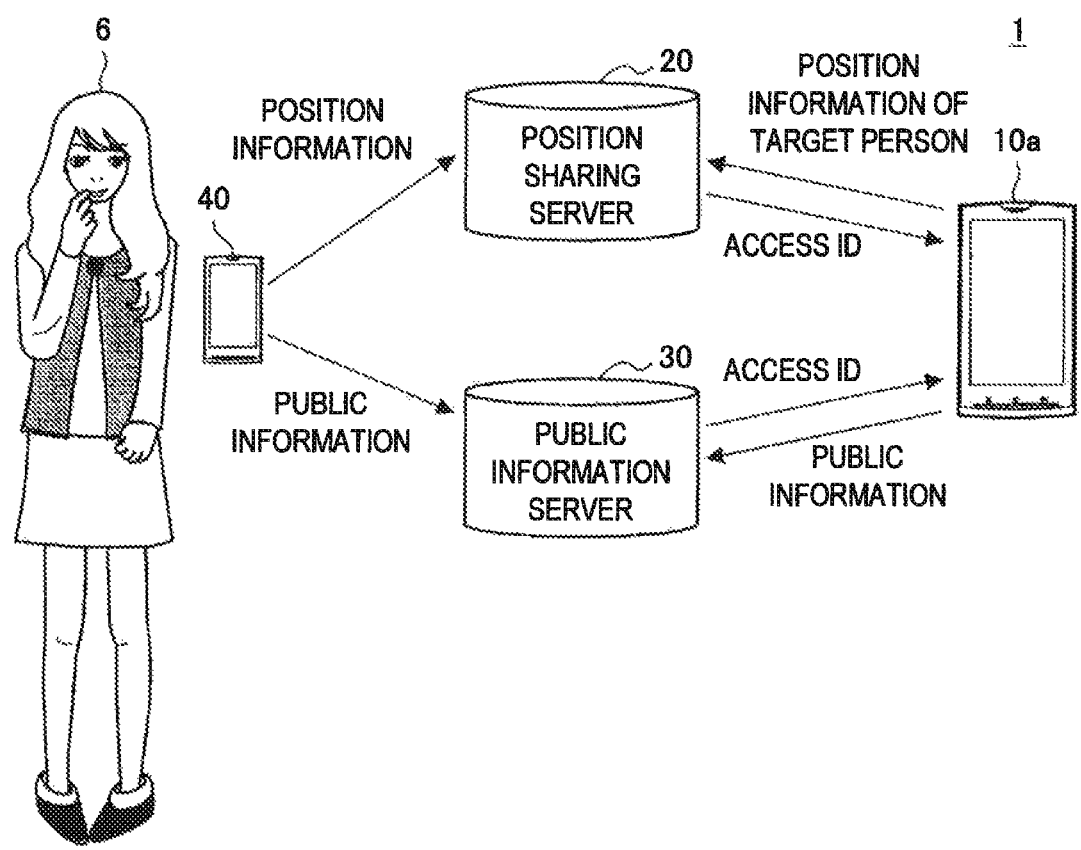
FIG. 2 is an explanatory diagram showing a configuration of a communication system according to a first embodiment of the present disclosure.

First, a configuration of a communication system according to a first embodiment of the present disclosure will be described with reference to FIG. 2. FIG. 2 is an explanatory diagram showing a configuration of a communication system according to the first embodiment of the present disclosure.

A communication system 1 mainly includes a user device 10a held by a user 5, a position sharing server 20, a public information server 30, and an information poster terminal 40 held by a target person 6 (also referred to as an information poster).

Additionally, in this specification and the drawings, a plurality of structural elements having substantially the same functional configuration may be distinguished from each other by each having a different letter added to the same reference numeral. For example, a plurality of elements having substantially the same functional configuration are distinguished from each other as necessary (for each embodiment) as a user device 10a and a user device 10b. However, if it is not particularly necessary to distinguish each of a plurality of structural elements having substantially the same functional configuration, only the same reference numeral is assigned. For example, if it is not particularly necessary to distinguish between the user device 10a and the user device 10b, they are simply referred to as the user device(s) 10.

The communication system 1 according to the present embodiment estimates the position of a target person 6, and public information of the target person 6 is specified based on the estimated position information. Accordingly, the target person 6, who is the information poster, registers the public information in advance in the public information server 30. Also, the target person 6 uploads his/her position information to the position sharing server 20 as he/she moves. For example, uploading of position information may be performed regularly at predetermined intervals. The public information posted by the target person 6 is specified by comparing the position information that is shared and the position of the target person 6 estimated by the user device 10a.

In the following, details of each structural element included in the communication system 1 will be given.

2-2. Functional Configuration of User Device

Figure 3:
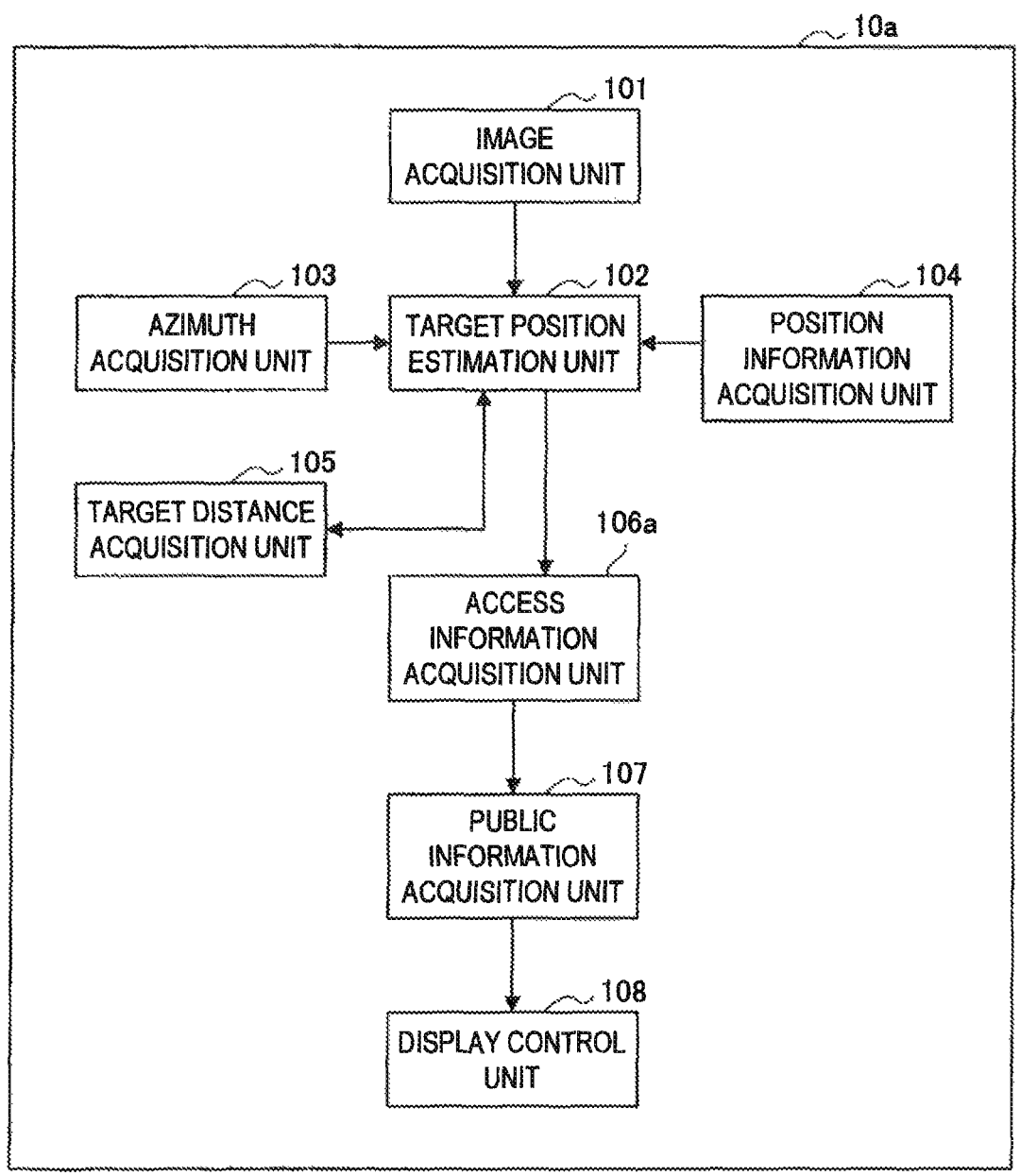
FIG. 3 is a block diagram showing a functional configuration of a user device according to the embodiment.
Figure 4:
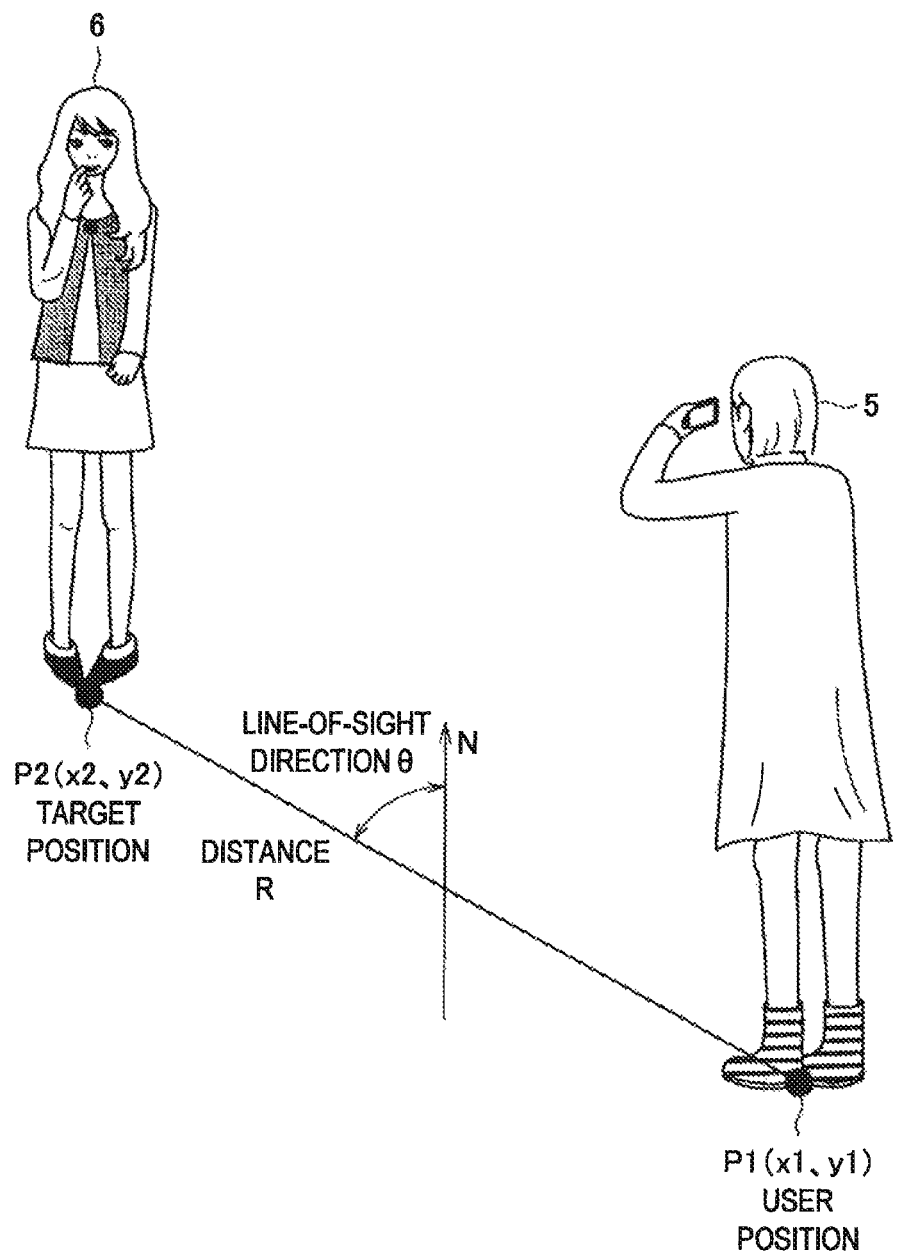
FIG. 4 is an explanatory diagram briefly describing an estimation method of a target position according to the embodiment.
Figure 5:
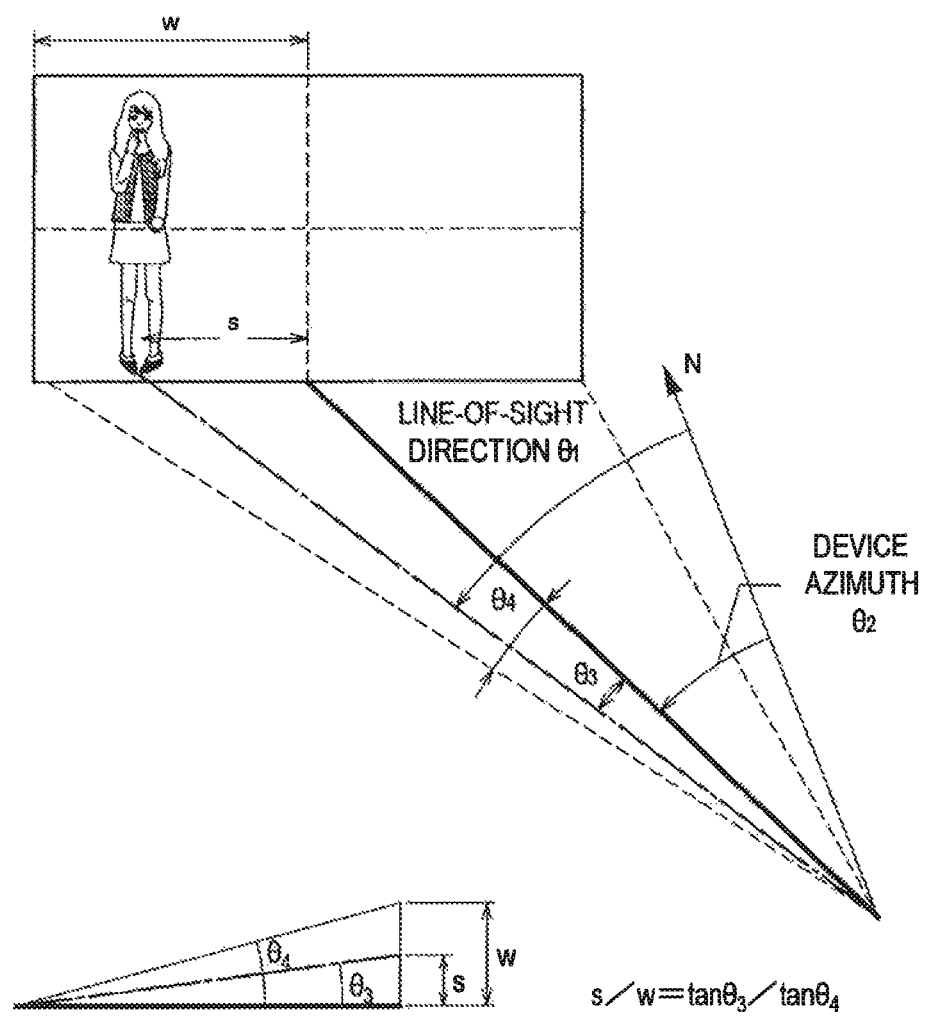
FIG. 5 is an explanatory diagram briefly describing a specification method of a line-of-sight direction according to the embodiment.
Figure 6:
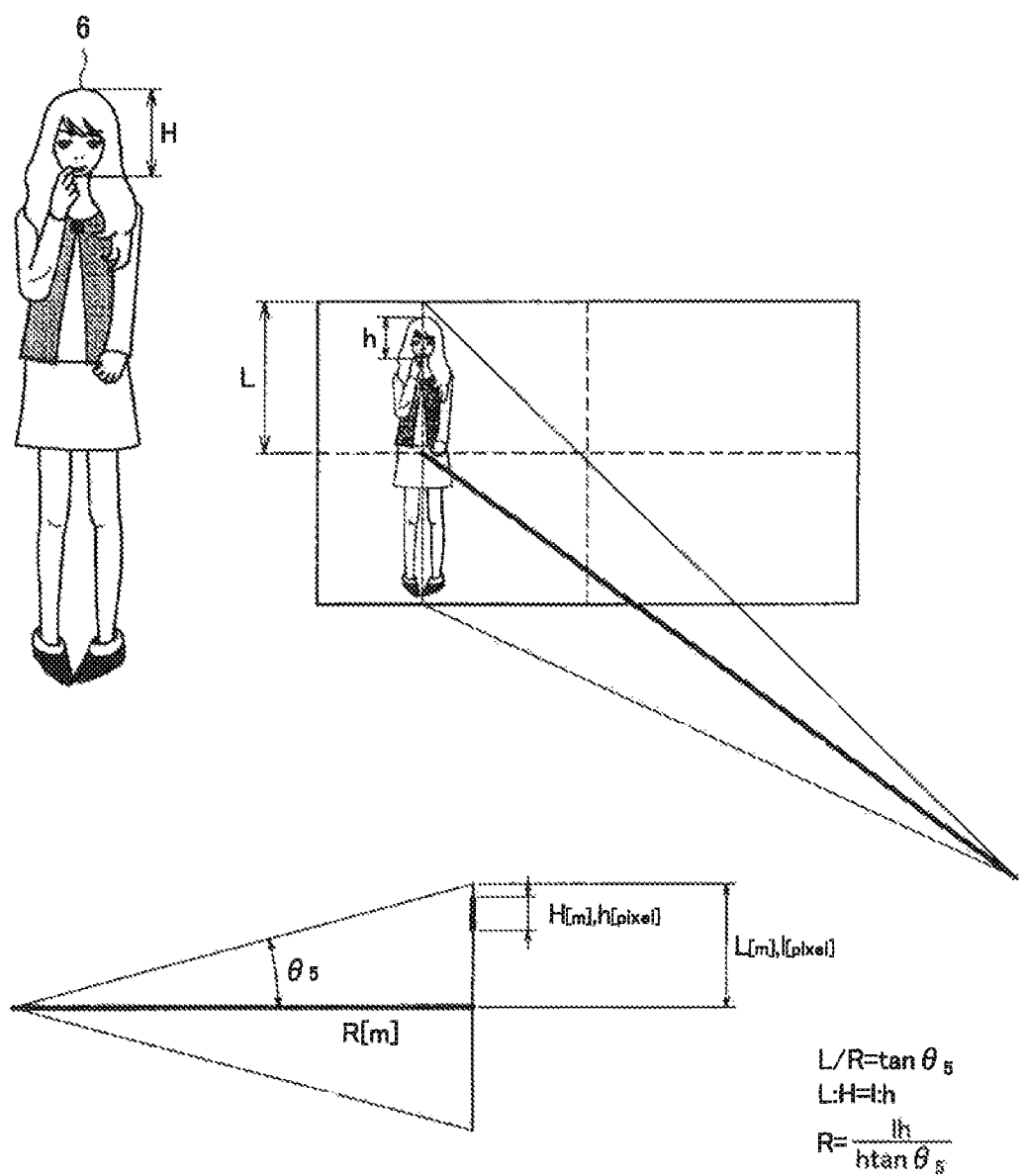
FIG. 6 is an explanatory diagram showing a first example of an estimation method of a distance from a user to a target position according to the embodiment.
Figure 7:
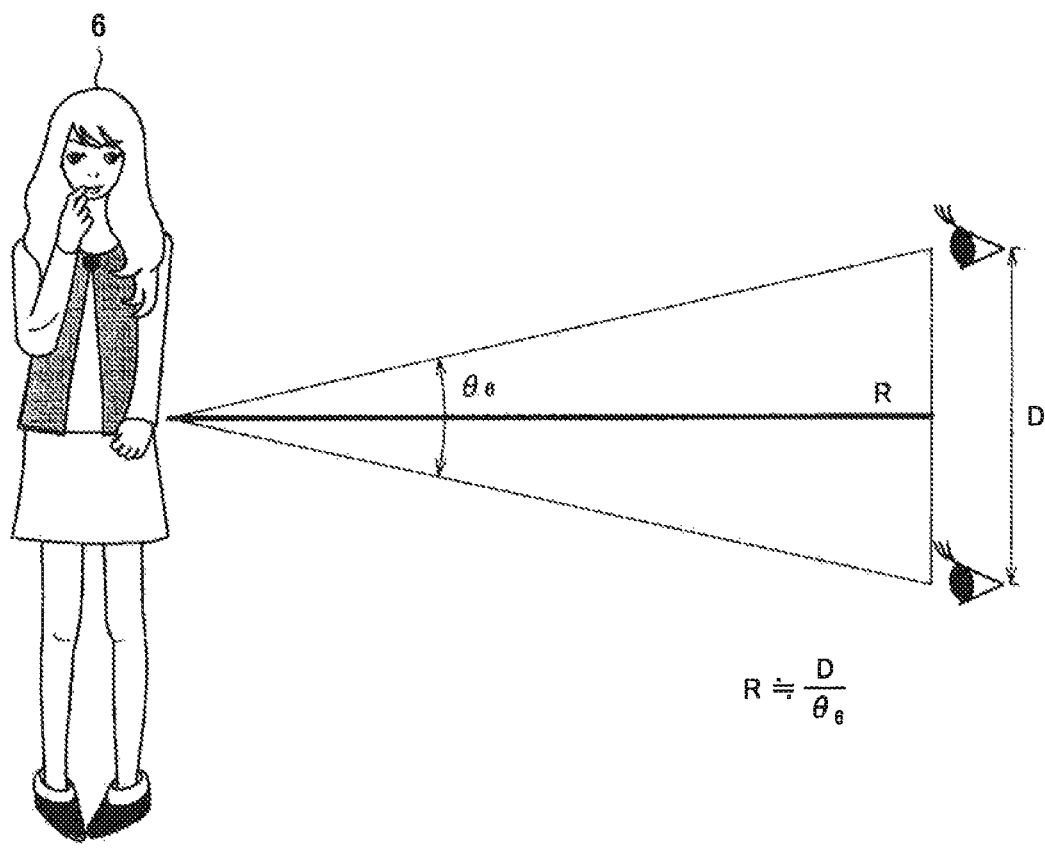
FIG. 7 is an explanatory diagram showing a second example of the estimation method of a distance from a user to a target position according to the embodiment.
Figure 8:
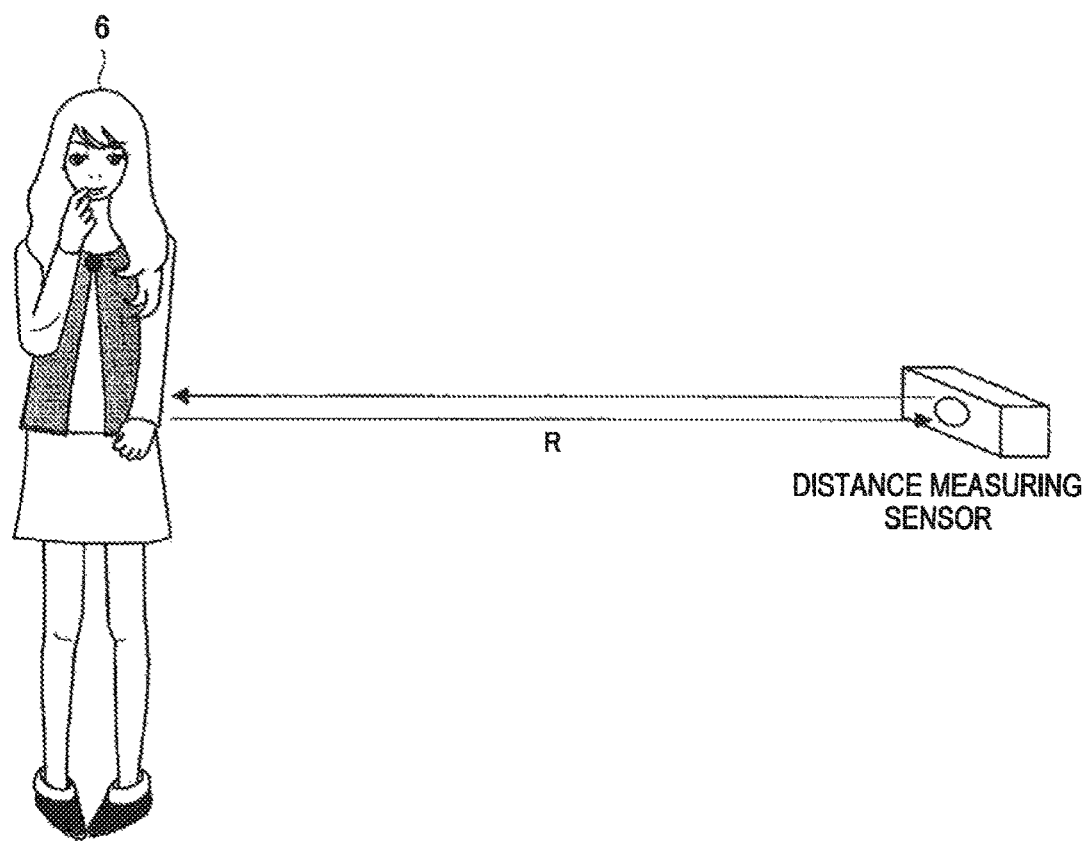
FIG. 8 is an explanatory diagram showing a third example of the estimation method of a distance from a user to a target position according to the embodiment.

Next, a functional configuration of the user device according to the present embodiment will be described with reference to FIGS. 3 to 8. FIG. 3 is a block diagram showing a functional configuration of the user device according to the present embodiment. FIG. 4 is an explanatory diagram briefly describing an estimation method of a target position according to the present embodiment. FIG. 5 is an explanatory diagram briefly describing a specification method of a line-of-sight direction according to the present embodiment. FIG. 6 is an explanatory diagram showing a first example of an estimation method of a distance from a user to a target position according to the present embodiment. FIG. 7 is an explanatory diagram showing a second example of the estimation method of a distance from a user to a target position according to the present embodiment. FIG. 8 is an explanatory diagram showing a third example of the estimation method of a distance from a user to a target position according to the present embodiment.

((User Device 10a))

Referring to FIG. 3, the user device 10a according to the present embodiment mainly includes an image acquisition unit 101, a target position estimation unit 102, an azimuth acquisition unit 103, a position information acquisition unit 104, a target distance acquisition unit 105, an access information acquisition unit 106a, a public information acquisition unit 107, and a display control unit 108.

(Image Acquisition Unit 101)

The image acquisition unit 101 has a function of acquiring an image that includes a target (a target person, a target object, or the like) that a user 5 is paying attention to. The image acquisition unit 101 may be an imaging apparatus, for example. Or, the image acquisition unit 101 may acquire an image captured by an imaging apparatus that is separate from the user device 10a. Additionally, an image to be acquired by the image acquisition unit 101 is an approximately real-time image. This is because the user 5 specifies, while looking at an image acquired by the image acquisition unit 101, a target person 6 included in the image. Then, public information of the target person 6 is specified by estimating the position of the target person 6 in the image and comparing the estimated position and position information that the target person 6 is actually sharing. Thus, the image to be acquired by the image acquisition unit 101 is preferably an approximately real-time image. Also, in the case of the image acquisition unit 101 acquiring an image captured by an imaging apparatus separate from the user device 10a to acquire an image including the target that the user 5 is paying attention to, this imaging apparatus is assumed to exist very close to the device including the position information acquisition unit 104 for acquiring the position of the user 5. The image acquisition unit 101 can supply the image acquired to the display control unit 108, and also to the target position estimation unit 102.

(Target Position Estimation Unit 102)

The target position estimation unit 102 has a function of estimating the position of the target person 6. As shown in FIG. 4, the target position estimation unit 102 can calculate a target position P2(x2, y2) using a distance R from a user position P1(x1, y1) to the target person 6 and a line-of-sight direction $\theta_1$. At this time, the target position estimation unit 102 can calculate a line-of-sight azimuth to the target person 6 using the value of a device azimuth $\theta_2$ acquired from the azimuth acquisition unit 103. For example, if the target person 6 is located near the center of the display screen, the target position estimation unit 102 can assume that the device azimuth $\theta_2$ is the line-of-sight direction $\theta_1$. Or, in the case a target person located away from the center of the display screen is specified, the target position estimation unit 102 can calculate the line-of-sight $\theta_1$ by calculating an azimuth difference $\theta_3$ between the device azimuth $\theta_2$ and the line-of-sight direction $\theta_1$ based on the position of the target person with respect to the angle of view. For example, as shown in FIG. 5, the relationship of the following Equation (1) is true for an angle $\theta_3$ to the target person with respect to the center of the screen, an angle $\theta_4$ which is half the angle of view, the number of pixels s, and the number of pixels w.

$$s/w = \tan\theta_3 / \tan\theta_4 \qquad \text{Equation (1)}$$

Here, the number of pixels w is half the horizontal width of the display screen, and the number of pixels s indicates the distance from the center of the display screen to the position of the target person 6. The angle $\theta_3$ can be obtained by using the relationship of this equation. Here, the device azimuth is acquired by the azimuth acquisition unit 103. Thus, the target position estimation unit 102 can calculate, using the value of the obtained angle $\theta_3$, the line-of-sight direction $\theta_1$ by adding the angle $\theta_3$ to the target person with respect to the center of the screen to the device azimuth $\theta_2$ ($\theta_1 = \theta_2 + \theta_3$).

The target position estimation unit 102 can assume that a position which is separated by the distance R from the current position P1(x1, y1) of the user device 10a in the line-of-sight direction $\theta_1$ is the target position P2(x2, y2). Here, the current position P1 is supplied by the position information acquisition unit 104. Also, the line-of-sight direction $\theta_1$ is calculated as described above by using the value of the device azimuth $\theta_2$ supplied by the azimuth acquisition unit 103. Furthermore, the distance R is supplied by the target distance acquisition unit 105.

(Azimuth Acquisition Unit 103)

The azimuth acquisition unit 103 has a function of acquiring the device azimuth $\theta 2$ of the user device 10. The azimuth acquisition unit 103 can be realized by using a 3-axis accelerometer and a 3-axis geomagnetic sensor, for example. For example, the azimuth acquisition unit 103 can generate azimuth data indicating the device azimuth $\theta_2$ of the user device 10 based on attitude angle data generated by performing predetermined attitude angle detection process based on 3-axis direction acceleration data acquired by the 3-axis accelerometer and 3-axis direction geomagnetic data detected by the 3-axis geomagnetic sensor. The azimuth acquisition unit 103 can supply the azimuth data generated to the target position estimation unit 102.

(Position Information Acquisition Unit 104)

The position information acquisition unit 104 has a function of acquiring current position information of the user device 10. The position information acquisition unit 104 may be realized by a GPS antenna that receives GPS signals from a plurality of GPS satellites, for example, and a GPS processing unit that calculates position information indicating the current position of the user device 10 based on the received GPS signals. Also, the position information acquisition unit 104 may acquire the current position information of the user device 10 using a navigation satellite other than the GPS. For example, navigation satellites other than the GPS may be Galileo, GLONASS, Hokuto, Michibiki, and the like. Here, as the navigation satellite, one type of satellite may be used, or a combination of navigation signals of a plurality of types of satellites may be used. The configuration to be used for position information acquisition can be changed as appropriate according to the technical level at the time of implementation. Furthermore, the position information acquisition unit 104 may be realized by a receiver that receives WiFi waves from a plurality of base stations and a current position calculation unit that estimates the distance from each base station based on the reception intensity of the received WiFi wave and calculates the current position based on the principle of triangulation by using the distance from each base station and the position of each base station. Or, the position information acquisition unit 104 may also have, together with an absolute positioning function, a function of autonomous navigation for calculating the current position using travelling direction and velocity that can be acquired from a gyro sensor and an accelerometer. The position information acquisition unit 104 can supply the position information acquired to the target position estimation unit 102.

(Target Distance Acquisition Unit 105)

The target distance acquisition unit 105 can acquire the distance R from the user device 10 to the target person 6. The target distance acquisition unit 105 can supply the value of the distance R acquired to the target position estimation unit 102.

For example, the target distance acquisition unit 105 may acquire the distance R from the user device 10 to the target person 6 using the size (the number of pixels) of the target person 6 on the display screen, as shown in FIG. 6. For example, in this case, the target distance acquisition unit 105 assumes an average size of a face H(m). Then, the target distance acquisition unit 105 can calculate the distance R using the following relationship and the size of a face h(pixel) on the display screen. That is, by applying the relationships of Equation (2) and Equation (3), Equation (4) is derived. The distance R is calculated by using this Equation (4). Here, l is assumed to be a value half the vertical width of the display screen, and L is assumed to be the actual distance corresponding to this l.

$$\frac{L}{R} = \tan\theta_5 \qquad \text{Equation (2)}$$

$$L:H = l:h \qquad \text{Equation (3)}$$

$$R = \frac{lH}{h\tan\theta_5} \qquad \text{Equation (4)}$$

Also, for example, the target distance acquisition unit 105 can estimate the distance R from the user device 10 to the target person 6 by using the parallax of a compound camera, as shown in FIG. 7. Here, the target distance acquisition unit 105 can calculated the distance R by using the relationship of the following Equation (5).

$$R = \frac{D}{\theta_6} \qquad \text{Equation (5)}$$

Furthermore, for example, the target distance acquisition unit 105 may acquire the distance R from the user device 10 to the target person 6 by using a distance measuring sensor, as shown in FIG. 8. Various distance measuring sensors may be used as the target distance acquisition unit 105. For example, the distance measuring sensor to be used here may be, but not limited to, an ultrasonic distance measuring sensor, a capacitance-displacement distance-measuring sensor, an optical distance measuring sensor, an electromagnetic distance measuring sensor and the like.

(Access Information Acquisition Unit 106a)

The access information acquisition unit 106a has a function of acquiring access information assigned with a time-limited access right to public information associated with the target person 6 in an image acquired by the image acquisition unit 101. The access information acquisition unit 106a can acquire the access information based on the position information of the target person 6 estimated by the target position estimation unit 102. Specifically, the access information acquisition unit 106a transmits the estimated position information of the target person 6 to the position sharing server 20. Then, the access information acquisition unit 106a receives access information for accessing the public information of a person specified based on this position information. The access information acquisition unit 106a can supply the access information acquired to the public information acquisition unit 107.

(Public Information Acquisition Unit 107)

The public information acquisition unit 107 has a function of acquiring public information using the access information supplied by the access information acquisition unit 106. Specifically, the public information acquisition unit 107 requests, using the access information, the public information server 30 for the public information of the target person 6. When the public information server 30 transmits the public information of the target person 6, the public information acquisition unit 107 receives the public information which has been transmitted, and supplies the public information acquired to the display control unit 108.

Also, the public information acquisition unit 107 can acquire public information that is selected based on the type of public information. For example, a user 5 who wants to view only public information including an agree button 502, described later, may perform setting such that only the public information that includes the agree button 502 will be acquired. Also, a user 5 who wants to view only public information including an affiliate link may perform setting such that only the public information that includes an affiliate link will be acquired. Further, the public information acquisition unit 107 may acquire public information that is selected based on an attribute of a poster of public information. For example, if a user 5 wants to view only public information posted by enterprises, setting may be performed such that only public information the attribute of whose poster is not an individual but an enterprise is acquired. Furthermore, the public information acquisition unit 107 may acquire public information that is selected based on the distance to the target person 6. Also, the public information acquisition unit 107 may select public information to be acquired such that public information that includes hidden words set in advance is not acquired. Here, selection of public information may be performed by the public information acquisition unit 107 or by the public information server 30.

(Display Control Unit 108)

The display control unit 108 has a function of controlling display of the display screen of the user device 10. The display control unit 108 can cause an image acquired by the image acquisition unit 101 to be displayed on the display screen, for example. Also, the display control unit 108 can cause public information acquired by the public information acquisition unit 107 to be displayed on the display screen. For example, the display control unit 108 may superimpose, and display, the public information on an image of the target person 6 acquired by the image acquisition unit 101. Furthermore, if a reception area for receiving an action from the user 5 is included in the displayed public information, the display control unit 108 can transmit information corresponding to the action to the public information server 30 while also controlling the display according to the action on this reception area from the user 5. Additionally, the display control unit 108 may control display of a display screen displayed on a display device incorporated in the user device 10. Or, the display control unit 108 may control display of a display screen displayed on a display device separate from the user device 10.

In the foregoing, examples of functions of the user device 10a according to the present embodiment have been described. Each of the structural elements described above may be configured using a general-purpose member or circuit, or by hardware dedicated to the function of each structural element. Furthermore, the function of each structural element may be realized by an arithmetic unit such as a CPU (Central Processing Unit) reading a control program describing procedures for realizing the function from a storage medium such as a ROM (Read Only Memory) or a RAM (Random Access Memory) storing the control program, and interpreting and executing the program. In the following, an example of a hardware configuration for realizing the functions of this user device 10a will be described. However, the configuration to be used may be changed as appropriate according to the technical level at the time of implementation of the present embodiment.

Additionally, a computer program for realizing each function of the user device 10a according to the present embodiment as described above may be created and installed in a personal computer or the like. Also, a computer-readable recording medium in which such a computer program is stored may be provided. The recording medium is a magnetic disk, an optical disk, a magneto-optical disk, a flash memory, or the like. Furthermore, the computer program may be distributed over a network, for example, without using the recording medium.

2-3. Example Hardware Configuration of User Device

Figure 9:
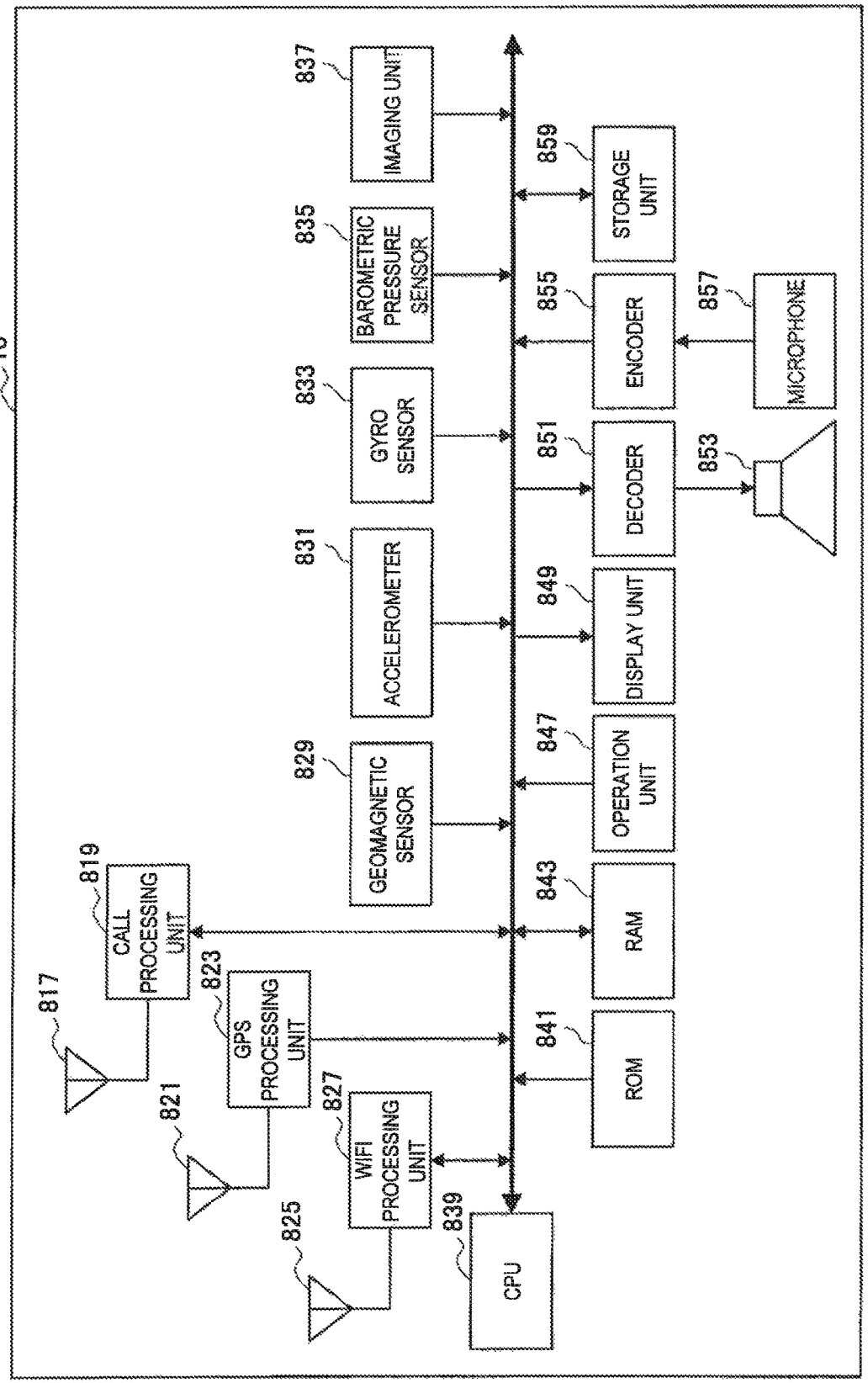
FIG. 9 is a block diagram showing a hardware configuration of the user device according to the embodiment.

Next, an example hardware configuration of the user device 10 according to an embodiment of the present disclosure will be described with reference to FIG. 9. FIG. 9 is a block diagram showing a hardware configuration of the user device according to the embodiment.

Here, an example of a configuration of the user device 10 will be described. Referring to FIG. 9, the user device 10 includes a telephone network antenna 817, a call processing unit 819, a GPS antenna 821, a GPS processing unit 823, a Wifi antenna 825, a Wifi processing unit 827, a geomagnetic sensor 829, an accelerometer 831, a gyro sensor 833, a barometric pressure sensor 835, an imaging unit 837, a CPU (Central Processing Unit) 839, a ROM (Read Only Memory) 841, a RAM (Random Access Memory) 843, an operation unit 847, a display unit 849, a decoder 851, a speaker 853, an encoder 855, a microphone 857, and a storage unit 859, for example. The user device 10 may be a smartphone, for example.

(Telephone Network Antenna 817)

The telephone network antenna 817 is an example of an antenna that has a function of connecting wirelessly to a mobile phone network for calling and communication. The telephone network antenna 817 can supply a communication signal received over the mobile phone network to the call processing unit 819.

(Call Processing Unit 819)

The call processing unit 819 has a function of performing various types of signal processing on signals transmitted/received by the telephone network antenna 817. For example, the call processing unit 819 can perform various types of signal processing on an audio signal input via the microphone 857 and encoded by the encoder 855, and supply the signal to the telephone network antenna 817. Also, the call processing unit 819 can perform various types of signal processing on an audio signal supplied by the telephone network antenna 817, and supply the signal to the decoder 851.

(GPS Antenna 821)

The GPS antenna 821 is an example of an antenna for receiving signals from a navigation satellite. The GPS antenna 821 can receive GPS signals from a plurality of GPS satellites, and inputs the GPS signals received to the GPS processing unit 823.

(GPS Processing Unit 823)

The GPS processing unit 823 is an example of a calculation unit for calculating position information based on a signal received from a navigation satellite. The GPS processing unit 823 calculates current position information based on a plurality of GPS signals input from the GPS antenna 821, and outputs the position information calculated. Specifically, the GPS processing unit 823 calculates the position of each GPS satellite from the orbital data of the GPS satellite, and calculates the distance from each GPS satellite to the user device 10 based on the difference between the transmission time and the reception time of the GPS signal. Then, current three-dimensional position can be calculated based on the position of each GPS satellite which has been calculated and the distance from each GPS satellite to the user device 10. Additionally, the orbital data of the GPS satellite used here may be included in the GPS signal, for example. Or, the orbital data of the GPS satellite may be acquired from an external server via the Wifi antenna 825.

(Wifi Antenna 825)

The Wifi antenna 825 is an antenna that has a function of transmitting and receiving a communication signal to/from a wireless LAN (Local Area Network) communication network according to Wifi specifications, for example. The Wifi antenna 825 can supply the signal received to the Wifi processing unit 827.

(Wifi Processing Unit 827)

The Wifi processing unit 827 has a function of performing various types of signal processing on signals supplied from the Wifi antenna 825. The Wifi processing unit 827 can supply to the CPU 839 a digital signal generated from a supplied analogue signal.

(Geomagnetic Sensor 829)

The geomagnetic sensor 829 is a sensor that detects geomagnetism in the form of a voltage value. The geomagnetic sensor 829 may be a 3-axis geomagnetic sensor that detects the geomagnetism for each of the X-axis direction, the Y-axis direction, and the Z-axis direction. The geomagnetic sensor 829 can supply the geomagnetic data detected to the CPU 839.

(Accelerometer 831)

The accelerometer 831 is a sensor that detects acceleration in the form of a voltage value. The accelerometer 831 may be a 3-axis accelerometer that detects the acceleration along the X-axis, the acceleration along the Y-axis, and the acceleration along the Z-axis. The accelerometer 831 can supply the acceleration data detected to the CPU 839.

(Gyro Sensor 833)

The gyro sensor 833 is a type of measuring instrument that detects an angle or an angular velocity of an object. This gyro sensor 833 may be a 3-axis gyro sensor that detects, in the form of voltage values, the rate of change of the rotation angles (angular velocity) around the X-axis, Y-axis, and the Z-axis. The gyro sensor 833 can supply the angular velocity data detected to the CPU 839.

(Barometric Pressure Sensor 835)

The barometric pressure sensor 835 is a sensor that detects surrounding barometric pressure in the form of a voltage value. The barometric pressure sensor 835 can detect the barometric pressure at a predetermined sampling frequency, and supply the barometric pressure data detected to the CPU 839.

(Imaging Unit 837)

The imaging unit 837 has a function of capturing a still image or a moving image via a lens, under the control of the CPU 839. The imaging unit 837 may cause the storage unit 859 to store the image detected.

(CPU 839)

The CPU 839 functions as an arithmetic processing unit and a control unit, and controls the entire operation within the user device 10 according to various programs. Also, the CPU 839 may be a microprocessor. This CPU 839 can realize various functions according to various programs.

(ROM 841, RAM 843)

The ROM 841 can store programs, arithmetic parameters and the like to be used by the CPU 839. The RAM 843 can temporarily store programs used in the execution of the CPU 839, parameters that are appropriately changed in the execution thereof, and the like.

(Operation Unit 847)

The operation unit 847 has a function of generating an input signal that is for an operation desired by the user 5. The operation unit 847 may be configured from an input unit used by the user 5 to input information, such as a touch sensor, a mouse, a keyboard, a button, a microphone, a switch and a lever, and an input control circuit for generating an input signal based on an input from the user 5 and outputting the signal to the CPU 839, for example.

(Display Unit 849)

The display unit 849 is an example of an output device, and may be a display device such as a liquid crystal display (LCD) device or an organic EL (organic light emitting diode (OLED)) device. The display unit 849 can provide information to the user 5 by displaying the information on the screen.

(Decoder 851, Speaker 853)

The decoder 851 has a function of performing decoding, analogue conversion and the like on data which has been input, under the control of the CPU 839. The decoder 851 can output an audio signal to the speaker 853 by performing decoding, analogue conversion and the like on audio data which has been input via the telephone network antenna 817 and call processing unit 819, for example. Also, the decoder 851 can output an audio signal to the speaker 853 by performing decoding, analogue conversion and the like on audio data input via the Wifi antenna 825 and the Wifi processing unit 827, for example. The speaker 853 can output sound based on the audio signal supplied by the decoder 851.

(Encoder 855, Microphone 857)

The encoder 855 has a function of performing digital conversion, encoding and the like on data which has been input, under the control of the CPU 839. The encoder 855 can output audio data by performing digital conversion, encoding and the like on an audio signal input from the microphone 857. The microphone 857 can collect sound, and output the sound as audio signals.

(Storage Unit 859)

The storage unit 859 is a device for storing data, and may include a storage medium, a recording device for recording data in the storage medium, a reading device for reading data from the storage medium, a deletion device for deleting data recorded in the storage medium, and the like. Here, as the storage medium, a non-volatile memory such as a flash memory, an MRAM (Magnetoresistive Random Access Memory), a FeRAM (Ferroelectric Random Access Memory), a PRAM (Phase change Random Access Memory) and an EEPROM (Electronically Erasable and Programmable Read Only Memory), a magnetic recording medium such as an HDD (Hard Disk Drive), and the like may be used.

2-4. Functional Configuration of Position Sharing Server

Figure 10:
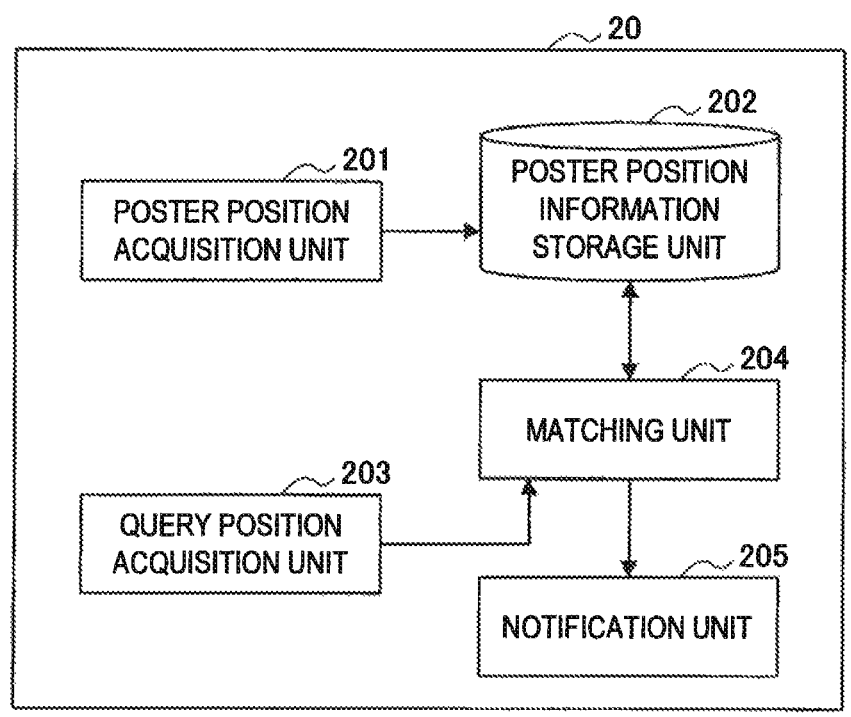
FIG. 10 is a block diagram showing a functional configuration of a position sharing server according to the embodiment.

Next, a functional configuration of the position sharing server according to the first embodiment of the present disclosure will be described with reference to FIG. 10. FIG. 10 is a block showing a functional configuration of the position sharing server according to the embodiment.

((Position Sharing Server 20))

Referring to FIG. 10, the position sharing server 20 mainly includes a poster position acquisition unit 201, a poster position information storage unit 202, a query position acquisition unit 203, a matching unit 204, and a notification unit 205.

(Poster Position Acquisition Unit 201)

The poster position acquisition unit 201 has a function of acquiring position information of a poster posting public information. When the position information of a poster is received, the poster position acquisition unit 201 can record the position information of the poster in the poster position information storage unit 202. At this time, the poster position acquisition unit 201 can receive, together with the position information, an identifier for identifying the poster, and record the identifier in association with the position information, for example. Also, the poster position acquisition unit 201 may record the date and time of acquisition of the position information, for example.

(Poster Position Information Storage Unit 202)

The poster position information storage unit 202 is a storage unit for storing position information of a poster. Poster position information to be recorded in the poster position information storage unit 202 may include position information, an identifier of the poster, and the date and time of acquisition of the position information, as described above. The poster position information storage unit 202 is a device for storing data, and may include a storage medium, a recording device for recording data in the storage medium, a reading device for reading data from the storage medium, a deletion device for deleting data recorded in the storage medium, and the like. Here, as the storage medium, a non-volatile memory such as a flash memory, an MRAM (Magnetoresistive Random Access Memory), a FeRAM (Ferroelectric Random Access Memory), a PRAM (Phase change Random Access Memory) and an EEPROM (Electronically Erasable and Programmable Read Only Memory), a magnetic recording medium such as ah HDD (Hard Disk Drive), and the like may be used.

(Query Position Acquisition Unit 203)

The query position acquisition unit 203 has a function of acquiring the position (referred here as a query position because it is position information transmitted by the user device 10a to query access information) of a target person 6 transmitted from the user device 10a. The query position that the query position acquisition unit 203 acquires here is position information of the target person 6 which has been estimated by the user device 10a. The query position acquisition unit 203 can supply information about the query position acquired to the matching unit 204.

(Matching Unit 204)

The matching unit 204 has a function of specifying which poster the target person queried by the user device 10a is, by performing matching of the query position acquired by the query position acquisition unit 203 and position information of poster(s) recorded in the poster position information storage unit 202. The matching unit 204 can supply information that identifies the specified poster to the notification unit 205.

(Notification Unit 205)

The notification unit 205 has a function of notifying the user device 10a of access information used for accessing the public information of the poster specified by the matching unit 204. The notification unit 205 can notify the user device 10a of access information assigned with a time-limited access right with limited access time for the public information, for example. Additionally, if the number of posters specified by the matching unit 204 is not one, the notification unit 205 may have the user 5 select a specific poster from a plurality of posters. For example, the notification unit 205 can provide characteristics of a plurality of posters extracted by the matching unit 204. For example, the notification unit 205 can notify the user 5 of characteristics such as "female in twenties", "male in fifties", and the like.

Additionally, various methods can be conceived as the method for realizing the access information assigned with a time-limited access right. For example, the notification unit 205 may change a key, such as a password, that is distributed for accessing information of the target person 6 every minute. It is preferable that presentation of a key is requested every time the user 5 performs an action on the public information. Depending on the circumstances, the user 5 may be allowed to access the public information for several minutes after he/she has stopped paying attention, by allowing access with a previous key or the one before the previous key. This key may be the URL (Uniform Resource Locator) itself for accessing the public information, for example.

2-5. Functional Configuration of Public Information Server

Figure 11:
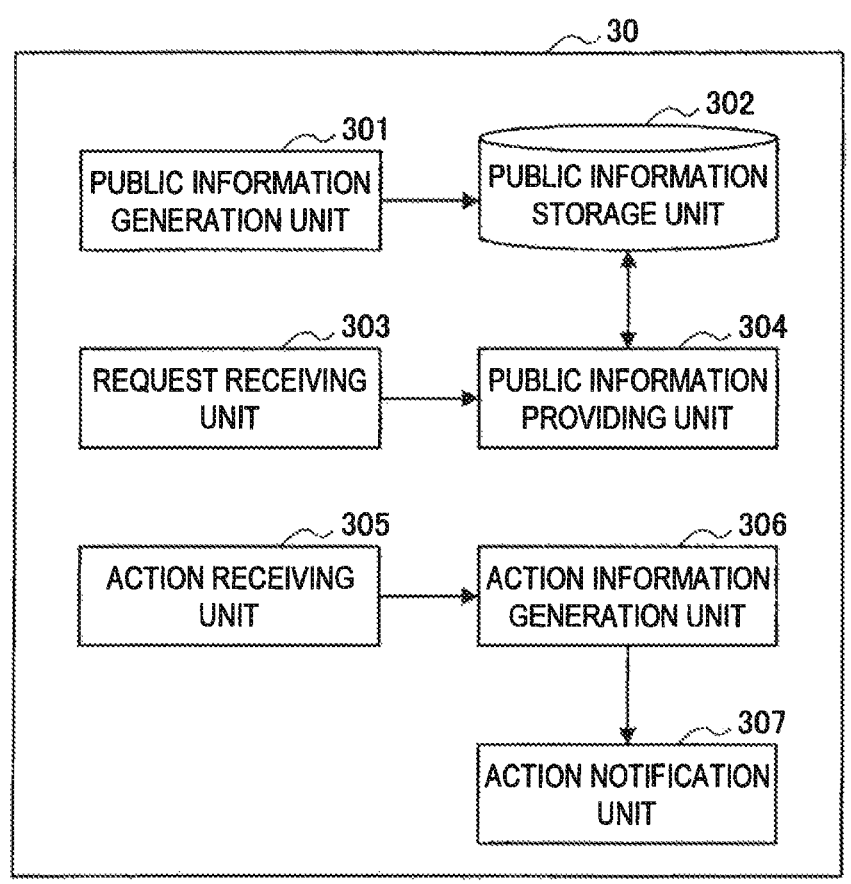
FIG. 11 is a block diagram showing a functional configuration of a public information server according to the embodiment.
Figure 12:
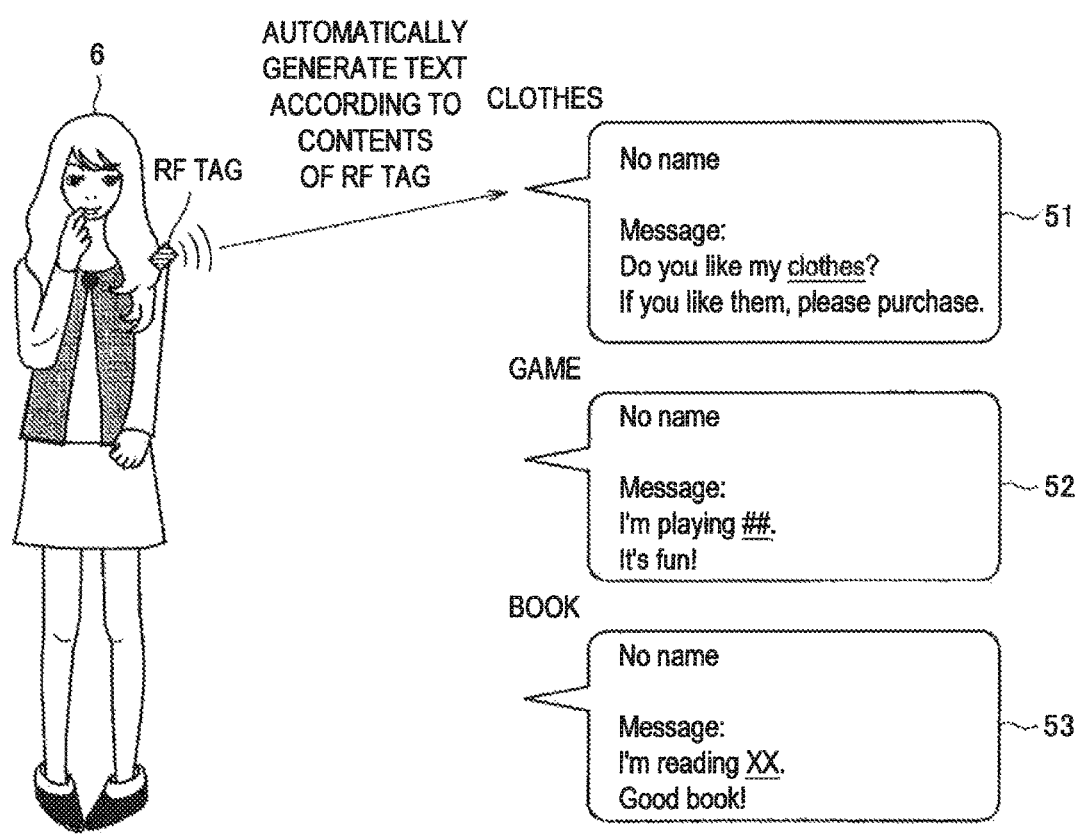
FIG. 12 is an explanatory diagram describing an example of public information according to the embodiment.
Figure 13:
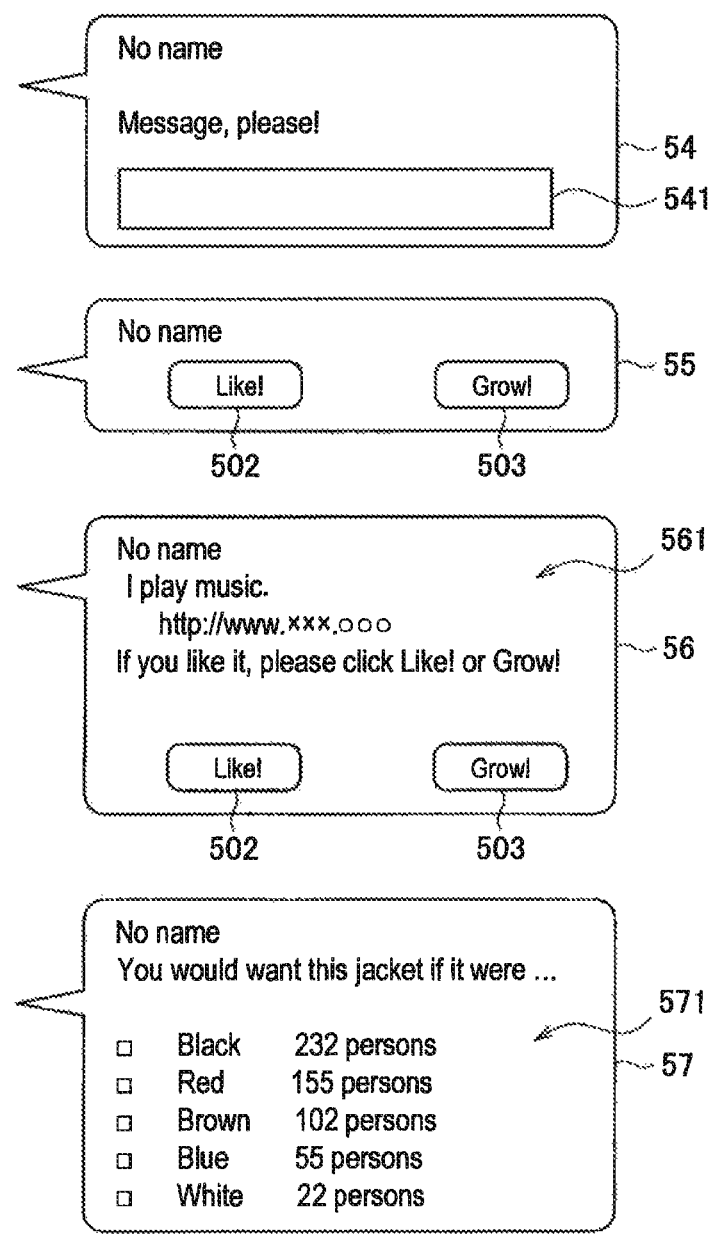
FIG. 13 is an explanatory diagram describing another example of the public information according to the embodiment.
Figure 14:
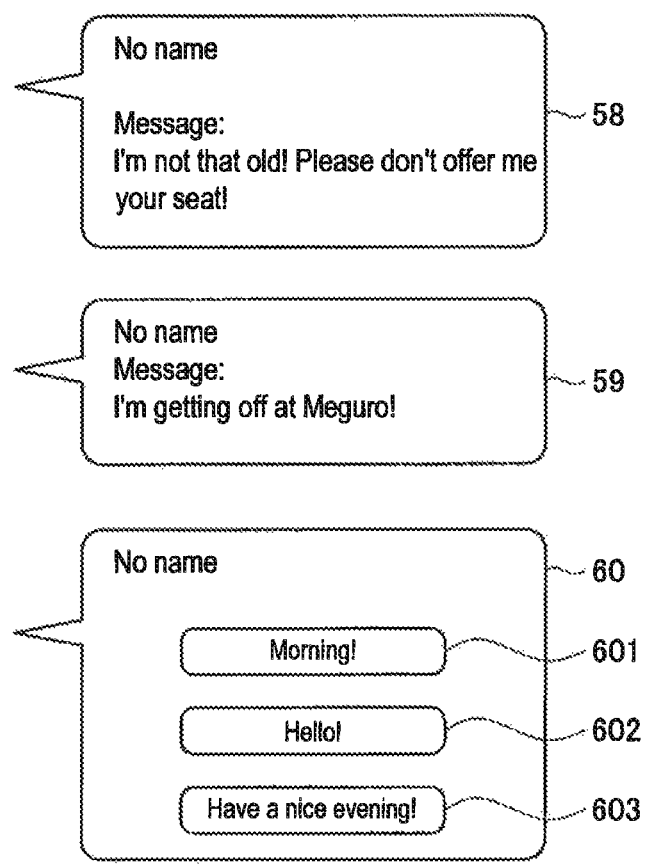
FIG. 14 is an explanatory diagram describing another example of the public information according to the embodiment.

Next, a functional configuration of the public information server according to the first embodiment of the present disclosure will be described with reference to FIGS. 11 to 15. FIG. 11 is a block diagram showing a functional configuration of the public information server according to the embodiment. FIG. 12 is an explanatory diagram describing an example of the public information according to the embodiment. FIG. 13 is an explanatory diagram describing another example of the public information according to the embodiment. FIG. 14 is an explanatory diagram describing another example of the public information according to the embodiment. FIG. 15 is an explanatory diagram showing an example of an action notification according to the embodiment.

((Public Information Server 30))

Referring to FIG. II, the public information server 30 mainly includes a public information generation unit 301, a public information storage unit 302, a request receiving unit 303, a public information providing unit 304, an action receiving unit 305, an action information generation unit 306, and an action notification unit 307.

(Public Information Generation Unit 301)

The public information generation unit 301 has a function of generating public information and causing the public information storage unit 302 to store the public information. The public information generation unit 301 can provide the information poster terminal 40 of a poster a public information generation screen used for generating the public information, for example. With this public information generation screen, the public information may be generated by arranging parts and inputting texts, for example. Also, as shown in FIG. 12, the public information generation screen may have a function of automatically generating the public information by reading information about a commercial product stored in an RF (Radio Frequency) tag or the like. For example, public information including texts in which an affiliate link is embedded may be automatically generated by reading the RF tag. For example, the public information may be text or an image including information about clothes the poster is wearing, the game the poster is playing, the book the poster is reading, the music the poster is listening, and the like. Also, as described above, the text may include an affiliate link for the corresponding product, for example. A user 5 who has viewed the public information can purchase the corresponding product by operating this link. This affiliate link includes information specifying a user who has created the affiliate link (an affiliate). When a product is purchased through this affiliate link, part of the purchase price is paid to the affiliate.

The public information here is not limited to a message from the poster. For example, other examples of the public information are shown in FIG. 13. For example, public information 54 includes an input area 541 for receiving a message from a user 5 viewing the public information 54. Also, public information 55 includes an agree button 502 used by the user 5 to easily show that he/she agrees with the poster. A user 5 can show that he/she agrees with the poster just by pressing the agree button 502. Furthermore, the public information 55 includes a donation button 503. This donation button 503 is a button used for making a donation to the poster. A user 5 can make a donation to the poster just by pressing the donation button 503. Furthermore, public information 56 includes a message 561 including an address of a Web page related to the poster, the agree button 502, and the donation button 503. As shown here, a poster who takes part in art activities can use this public information 56 to call attention to his/her activities. Furthermore, public information 57 may include a poll area 571. For example, a message "You would want this jacket if it were . . . " and the poll area 571 for receiving votes are included with respect to the clothes the poster is wearing. Such public information may be used for market research on which color would sell with regard to the clothes that are being worn. Voting result up to a current time, for example, may also be displayed in the poll area 571. Furthermore, if an option that a user 5 prefers is not included in the options shown in the poll area 571, the user 5 may be enabled to create a new option.

Other examples of public information are shown in FIG. 14. For example, public information 58 and public information 59 are examples of public information which include only the messages from a poster. For example, a poster can post, as the public information, a message "I'm not that old! Please don't offer me your seat!" Also, as shown in the public information 59, a poster can post, as the public information, a message "I'm getting off at Meguro!" With such public information 59 being posted, a nearby user 5 who has viewed this public information 59 can know that the seat occupied by the poster will be available at Meguro station. Also, if the poster is asleep when arriving at Meguro station, a nearby user 5 who has noticed this may wake up the poster.

Furthermore, the public information generated here may be assigned with restriction information regarding posting. For example, a poster may restrict the people for whom the poster posts his/her public information by the distance. A user who is to acquire the public information holds the user device 10 over a target person 6 who is the poster. Thus, it is preferable if a poster who would feel uneasy about the user device 10 being held over him/her at a close distance can perform setting such that the public information is provided to people who are away by a predetermined distance or more. Additionally, this distance-based restriction regarding posting may be set regardless of the setting of the poster to adjust the load on the communication system.

Additionally, here, the public information server 30 is configured to provide the public information generation screen, but the present disclosure is not limited to such an example. For example, the public information generation screen may be generated and provided by an application in the information poster terminal 40. In this case, the public information generation unit 301 can receive poster information generated at the information poster terminal 40, and cause the public information storage unit 302 to store the information.

(Public Information Storage Unit 302)

The public information storage unit 302 is a storage unit for storing generated public information. Public information that is stored in the public information storage unit 302 may be managed in association with an identifier for identifying a poster. The public information storage unit 302 is a device for storing data, and may include a storage medium, a recording device for recording data in the storage medium, a reading device for reading data from the storage medium, a deletion device for deleting data recorded in the storage medium, and the like. Here, as the storage medium, a non-volatile memory such as a flash memory, an MRAM (Magnetoresistive Random Access Memory), a FeRAM (Ferroelectric Random Access Memory), a PRAM (Phase change Random Access Memory) and an EEPROM (Electronically Erasable and Programmable Read Only Memory), a magnetic recording medium such as ah HDD (Hard Disk Drive), and the like may be used.

(Request Receiving Unit 303)

The request receiving unit 303 has a function of receiving a request for public information from the user device 10. For example, when the user device 10 accesses the public information server 30 based on access information, the request receiving unit 303 can specify the identifier of the poster from the access information and supply the identifier to the public information providing unit 304.

(Public Information Providing Unit 304)

The public information providing unit 304 has a function of providing the public information of a poster which has been requested by the user device 10. When an identifier of a specific poster is supplied by the request receiving unit 303, the public information providing unit 304 extracts the public information of the poster specified by the identifier from the public information storage unit 302. Then, the public information providing unit 304 can supply the public information extracted to the user device 10. Additionally, the public information providing unit 304 preferably maintains the session while the user 5 is paying attention to the target person 6. For example, the public information providing unit 304 preferably maintains, for a limited time, the session with the user device 10 by issuing a time limit key, in the case the user 5 has taken his/her eyes off the target person 6.

(Action Receiving Unit 305)

The action receiving unit 305 has a function of receiving information about an action performed on the public information provided to the user device 10. For example, the action receiving unit 305 can receive information regarding pressing of the agree button 502 described above, a comment input via an input area in the public information described above, an option selected by the user 5 for the poll described above, and the like. When an action is received from the user 5, the action receiving unit 305 can supply the information received to the action information generation unit 306.

(Action Information Generation Unit 306)

The action information generation unit 306 can generate action information regarding an action performed by the user 5 on public information. The action information generation unit 306 may generate, for each piece of public information, information about when, where and what type of action was performed, for example. Also, the action information generation unit 306 may count, for each type of action, the number of actions for each piece of public information, and generate action information indicating a ranking of the number of actions. The action information generation unit 306 may also generate action information as statistical information. Furthermore, the action information generation unit 306 may generate action information for notification to the poster of public information.

(Action Notification Unit 307)

The action notification unit 307 has a function of notifying the poster of public information of action information regarding an action for the public information. For example, the action notification unit 307 may notify the poster that an action has been performed, every time an action is performed for the public information. Also, here, the action notification unit 307 may issue a notification to the effect that an action has been performed, after a predetermined condition has been satisfied after the performance of the action. The predetermined condition here may be a predetermined lapse of time after reception of the action, for example. Also, the predetermined condition may be separation of the user and the poster by a predetermined distance. Furthermore, the predetermined condition may be a request from the poster, for example. The communication system 1 according to the present embodiment keeps in mind anonymous and one-time communication. For example, if there aren't many people around, the person who has performed an action might be specified by the poster. Thus, by intentionally issuing a notification regarding an action with a delay of a predetermined time, it becomes possible to prevent specification of the user 5 who has performed an action even when there aren't many people around. This predetermined time is preferably a time necessary for prevention of specification of the user 5. Also, the action notification unit 307 may notify the poster of statistical information regarding the action. For example, an example of action information which is to be notified to the poster may be ranking information of the number of actions (the rank of the poster himself/herself, the number of actions of people ranking high, and the like), the total number of actions within a predetermined period, and the like.

For example, an example of action information to be notified by the action notification unit 307 is shown in FIG. 15. For example, action information 41 includes information about the number of times the agree button 502 has been pressed with respect to each poster, such as "x persons Liked you this month, totaling to y persons." Also, action information 42 includes a message input to an input section of the public information, such as "The following message has been received. —You are missing a button!—He is not groping you!"

2-6. Example Operation

Figure 16:
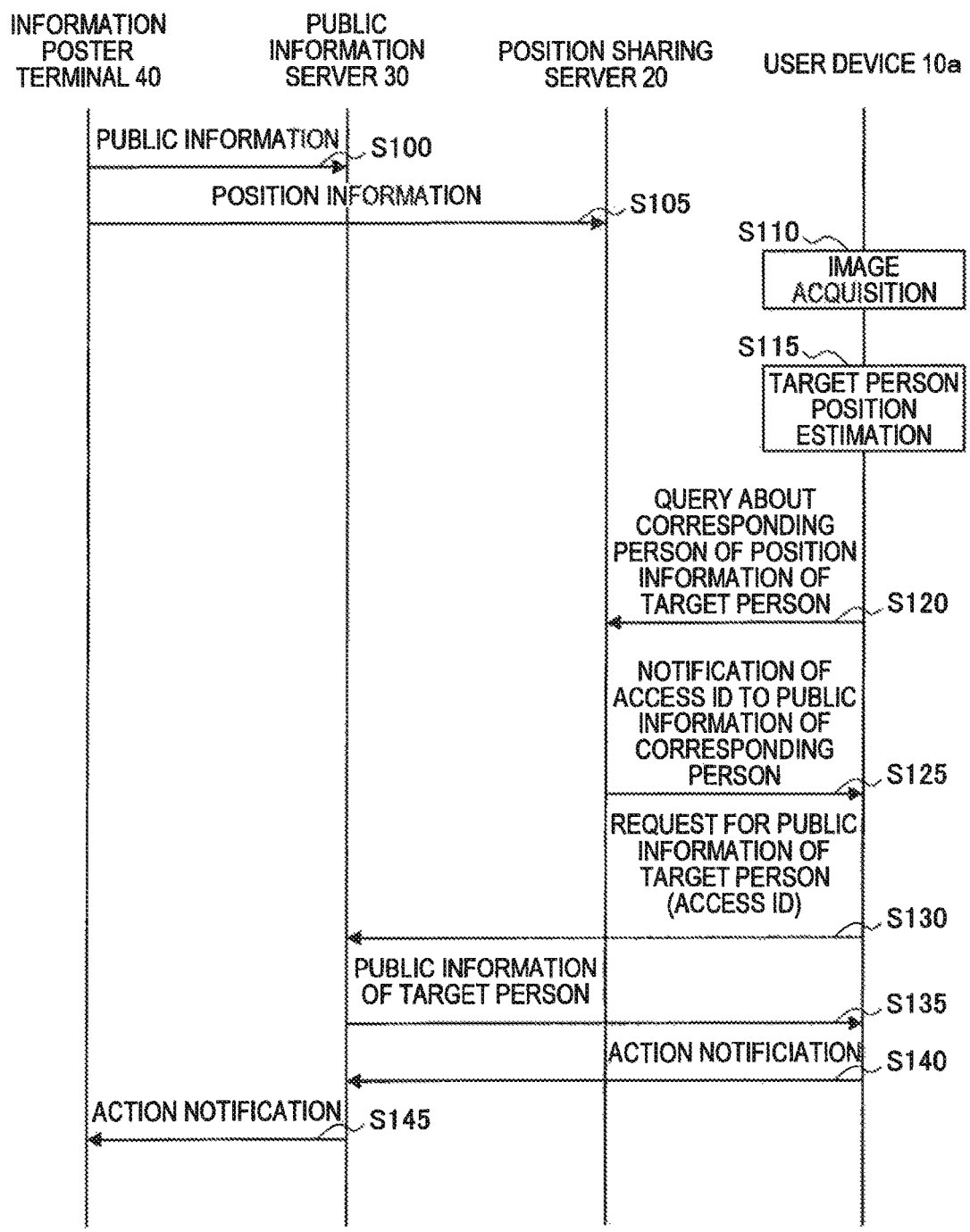
FIG. 16 is a sequence diagram showing an example operation of the communication system according to the embodiment.
Figure 17:
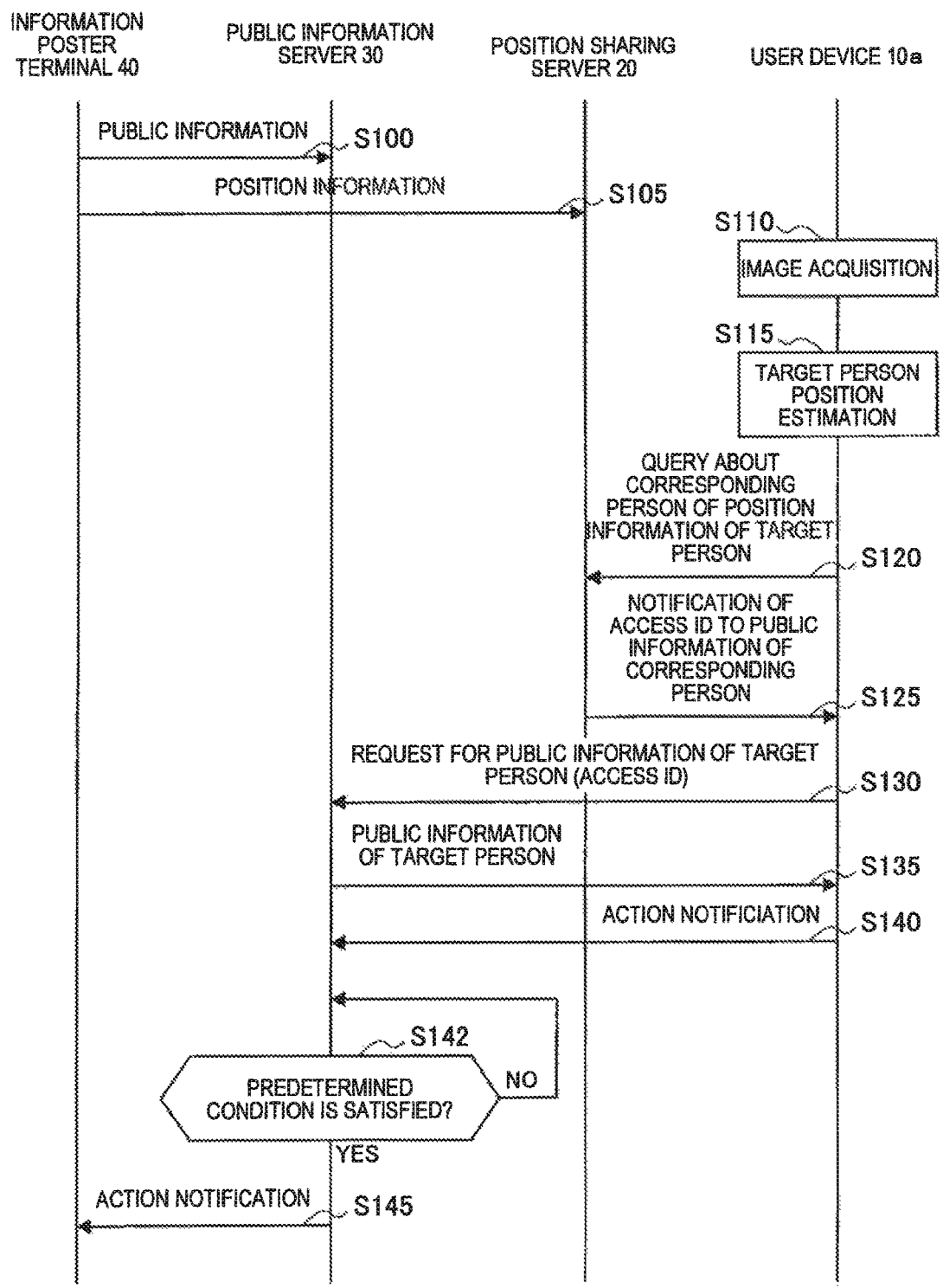
FIG. 17 is a sequence diagram showing another example operation of the communication system according to the embodiment.

Here, an example operation of the communication system 1 according to the first embodiment of the present disclosure will be described with reference to FIGS. 16 and 17. FIG. 16 is a sequence diagram showing an example operation of the communication system according to the embodiment. FIG. 17 is a sequence diagram showing another example operation of the communication system according to the embodiment.

Referring to FIG. 16, first, the information poster terminal 40 transmits public information which has been generated to the public information server 30 (S100). Then, the information poster terminal 40 periodically transmits position information to the position sharing server 20 (S105). The position sharing server 20, which has received the position information, stores the position information together with the identifier of the poster.

Then, when the user 5 holds the user device 10a over the target person 6, who is the information poster, and taps the target person displayed on the display screen, the user device 10a acquires an image (S110). At this time, the image acquisition unit 101 takes a snapshot at the time of tap input, for example, and supplies the same to the target position estimation unit 102. Then, the target position estimation unit 102 estimates the position of the target person (S115).

Next, the access information acquisition unit 106a of the user device 10a transmits the position information of the target person to the position sharing server and queries a corresponding person (S120). After specifying the corresponding person in response to the query, the position sharing server 20 transmits an access ID for the public information of the corresponding person to the user device 10a (S125).

The user device 10a requests the public information server 30 for the public information of the target person using the access ID acquired (S130). The public information server 30 transmits the public information of the target person to the user device 10a in response to the request (S135).

When the user 5 performs some kind of action on the public information acquired, the user device 10a notifies the public information server 30 of the performance of the action (S140). The public information server 30 can notify the information poster terminal 40 of this action (S145).

Additionally, the timing of action notification shown in step S145 may be determined based on a predetermined condition, as shown in FIG. 17. The public information server 30 can determine whether the predetermined condition has been satisfied after reception of the action notification (S140) from the user device 10a (S142). Action notification may be performed after it is determined in step S142 that the predetermined condition is satisfied (S145). The predetermined condition here may be a predetermined lapse of time after reception of the action, for example. Also, the predetermined condition may be separation of the user and the poster by a predetermined distance. Furthermore, the predetermined condition may be a request from the poster, for example. Additionally, although an example modification where action notification is performed after the predetermined condition is satisfied has been described, such a configuration can be applied to any of the embodiments described below.

3. Second Embodiment (Example of Access Information Acquisition Based on Position Information and View Information)

3-1. System Configuration

Figure 18:
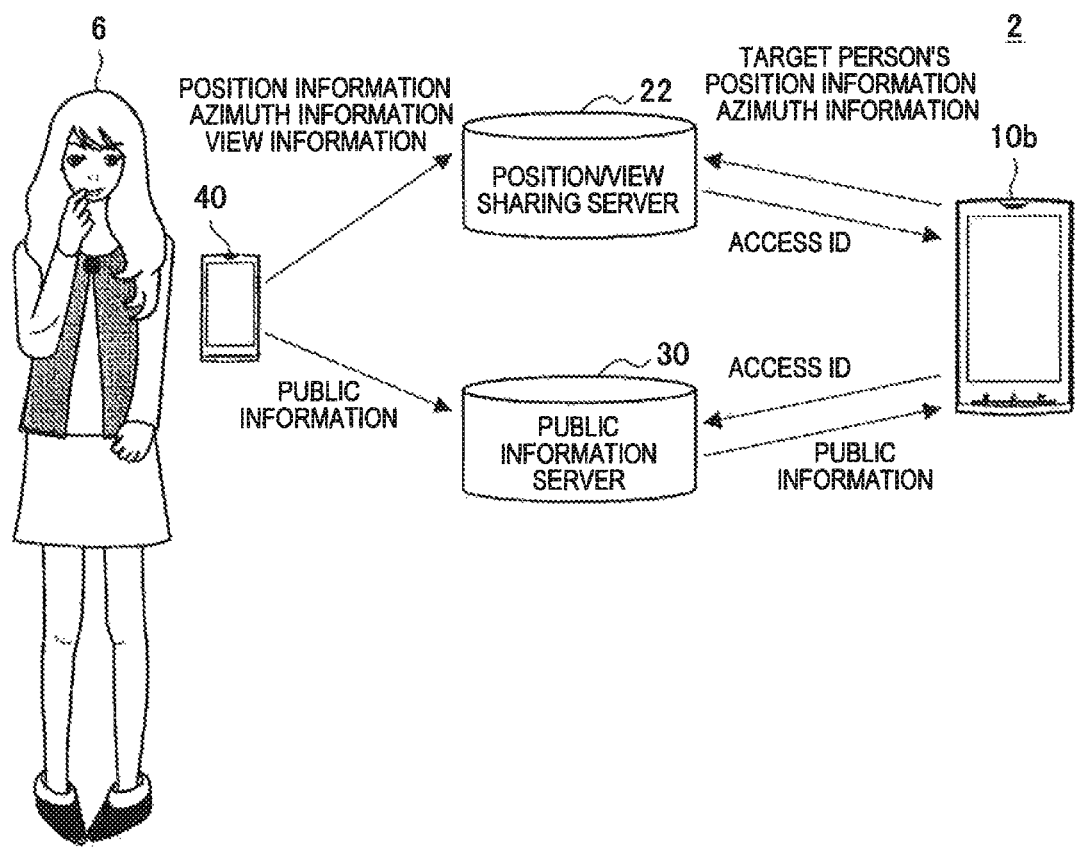
FIG. 18 is an explanatory diagram showing a configuration of a communication system according to a second embodiment of the present disclosure.

Next, a configuration of a communication system according to a second embodiment of the present disclosure will be described with reference to FIG. 18. FIG. 18 is an explanatory diagram showing a configuration of a communication system according to a second embodiment of the present disclosure.

A communication system 2 mainly includes a user device 10b held by a user 5, a position/view sharing server 22, a public information server 30, and an information poster terminal 40.

With the communication system 2 according to the present embodiment, the public information of a target person 6 is specified based on an estimated position of the target person 6 and estimated view information of the target person 6.

Figure 19:
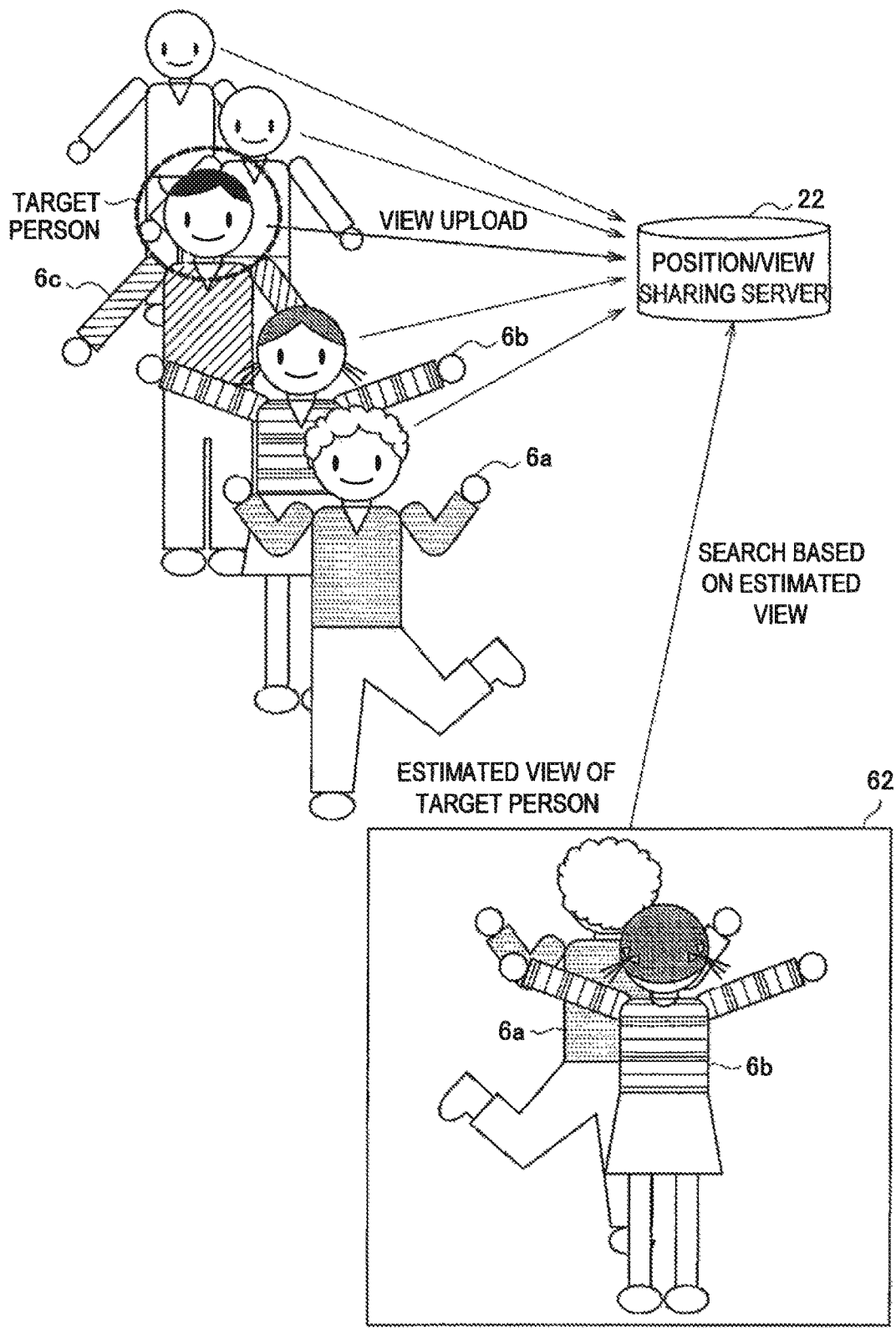
FIG. 19 is an explanatory diagram briefly showing view sharing according to the embodiment.

For example, a case is considered where, as shown in FIG. 19, in a situation where a plurality of information posters are forming a line, the user 5 wants the public information of a specific target person 6c in the line. At this time, it is assumed that each target person 6 is seen from the front by the user device 10b. The user device 10b estimates here the view of the target person 6c based on an image that the user device 10b can acquire. A view image 62 is shown in the lower right of FIG. 19. At this time, the back of a person 6a and a person 6b should be seen by the target person 6c, and the person 6a should be seen on the left of the person 6b. Moreover, the user device 10b may also be able to estimate the azimuth of the target person 6 by image analysis.

On the other hand, a target person 6 who is an information poster regularly uploads his/her position information and view information to the position/view sharing server 22. For example, uploading of the position information and view information may be performed regularly at predetermined intervals. The position/view sharing server 22 can specify the public information posted by a target person 6 by comparing the position information and the view information that are being shared and the position information and the view information of the target person 6 estimated by the user device 10b. Here, information about the azimuth the target person 6 is facing may be included in the view information, in addition to the estimated image. Then, the position/view sharing server 22 can also use for matching the azimuth information that is shared and the azimuth information that is estimated. Additionally, the view information that is uploaded here may include image data including a view of the information poster, for example. Also, the view information that is uploaded here may include information about the azimuth the information poster is facing.

In the following, details of each structural element included in the communication system 2 will be given. Additionally, in the following, a description will be given mainly on the differences to the first embodiment, and will be omitted for the same elements as the first embodiment.

3-2. Functional Configuration of User Device

Figure 20:
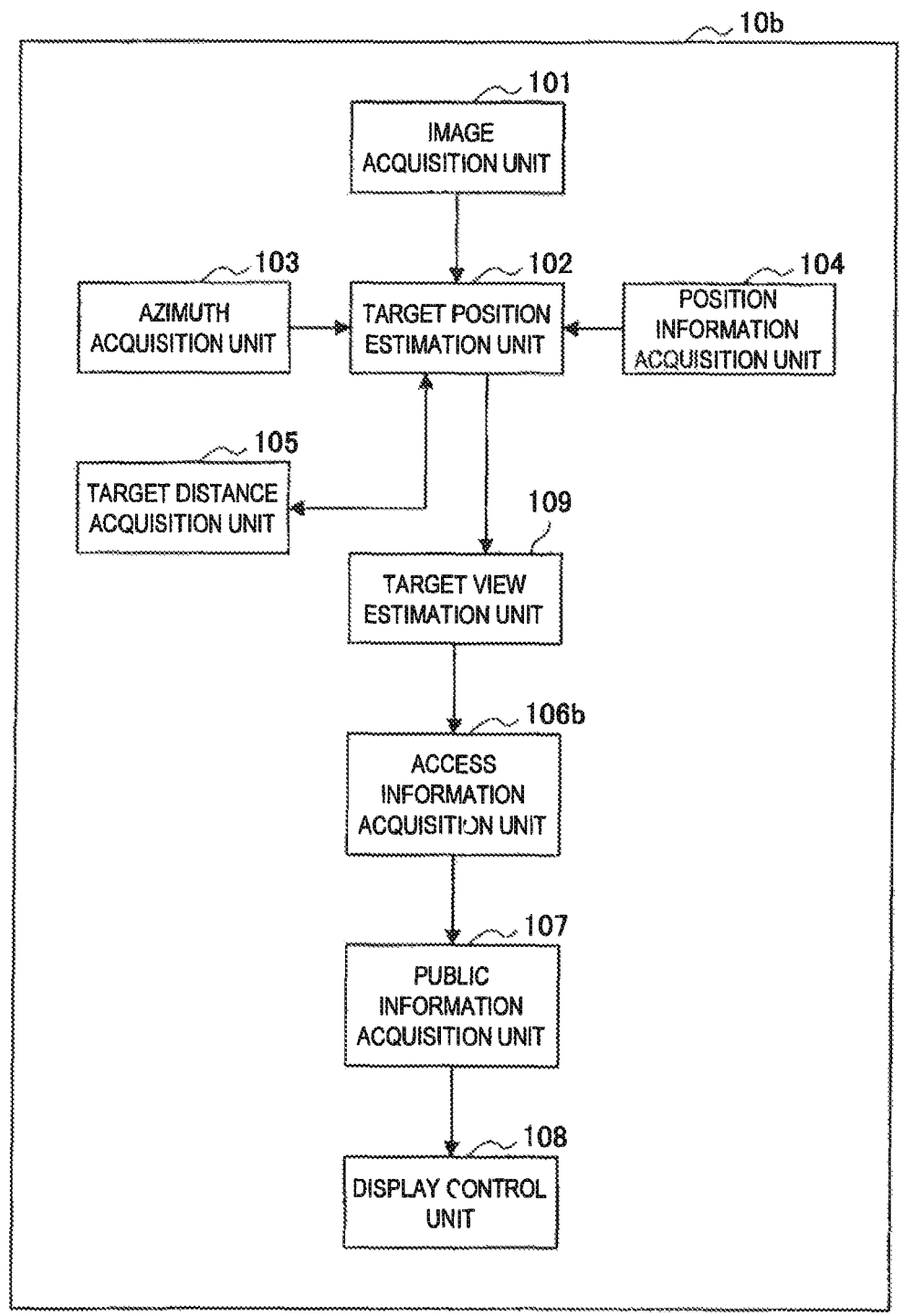
FIG. 20 is a block diagram showing a functional configuration of a user device according to the embodiment.

Next, a functional configuration of the user device according to the present embodiment will be described with reference to FIG. 20. FIG. 20 is a block diagram showing a functional configuration of the user device according to the embodiment.

((User Device 10b))

Referring to FIG. 20, the user device 10b according to the present embodiment mainly includes an image acquisition unit 101, a target position estimation unit 102, an azimuth acquisition unit 103, a position information acquisition unit 104, a target distance acquisition unit 105, a target view estimation unit 109, an access information acquisition unit 106b, a public information acquisition unit 107, and a display control unit 108.

(Target View Estimation Unit 109)

The target view estimation unit 109 has a function of estimating the view information of a target person 6. As has been described using FIG. 19, in the present embodiment, the view information is used to specify the public information of a target person. The target view estimation unit 109 can generate estimated view information of a target person 6 using an image acquired by the image acquisition unit 101. For example, this view information includes a view image seen by the target person 6, estimated from an image acquired by the image acquisition unit 101. Also, the view information may include information about the azimuth the target person 6 is facing. The target view estimation unit 109 can supply, to the access information acquisition unit 106b, the view information estimated and the position information of the target person 6 estimated by the target position estimation unit 102.

(Access Information Acquisition Unit 106b)

The access information acquisition unit 106b has a function of acquiring access information assigned with a time-limited access right to the public information associated with a target person 6 in an image acquired by the image acquisition unit 101. The access information acquisition unit 106b can acquire the access right based on the position information of the target person 6 estimated by the target position estimation unit 102. Also, the access information acquisition unit 106b can acquire the access right based on the view information of the target person 6 estimated by the target view estimation unit 109. Specifically, the access information acquisition unit 106b transmits, to the position/view sharing server 22, the position information and the view information of the target person 6 which have been estimated. Then, the access information acquisition unit 106b receives access information for accessing the public information of a person specified based on at least either of the position information and the view information. The access information acquisition unit 106b can supply the access information acquired to the public information acquisition unit 107.

In the foregoing, examples of functions of the user device 10b according to the present embodiment have been described. Each of the structural elements described above may be configured using a general-purpose member or circuit, or by hardware dedicated to the function of each structural element. Furthermore, the function of each structural element may be realized by an arithmetic unit such as a CPU (Central Processing Unit) reading a control program describing procedures for realizing the function from a storage medium such as a ROM (Read Only Memory) or a RAM (Random Access Memory) storing the control program, and interpreting and executing the program. This user device 10b may take the hardware configuration described in the first embodiment of the present disclosure using FIG. 9. However, the configuration to be used may be changed as appropriate according to the technical level at the time of implementation of the present embodiment.

Additionally, a computer program for realizing each function of the user device 10b according to the present embodiment as described above may be created and installed in a personal computer or the like. Also, a computer-readable recording medium in which such a computer program is stored may be provided. The recording medium is a magnetic disk, an optical disk, a magneto-optical disk, a flash memory, or the like. Furthermore, the computer program may be distributed over a network, for example, without using the recording medium.

3-3. Functional Configuration of Position/View Sharing Server

Next, a functional configuration of the position/view sharing server according to the second embodiment of the present disclosure will be described with reference to FIG.

Figure 21:
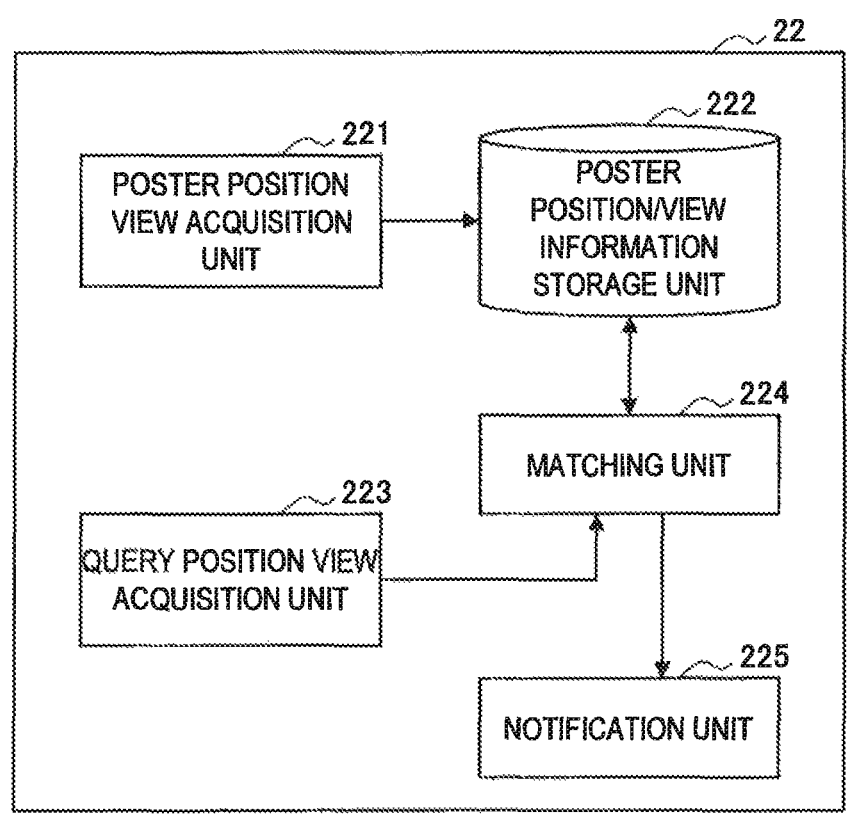
FIG. 21 is a block diagram showing a functional configuration of a position/view sharing server according to the embodiment.

21. FIG. 21 is a block diagram showing a functional configuration of the position/view sharing server according to the embodiment.

((Position/View Sharing Server 22))

Referring to FIG. 21, the position/view sharing server 22 mainly includes a poster position view acquisition unit 221, a poster position/view information storage unit 222, a query position view acquisition unit 223, a matching unit 224, and a notification unit 225.

(Poster Position View Acquisition Unit 221)

The poster position view acquisition unit 221 has a function of acquiring position information and view information of a poster posting public information. When position information and view information of a poster are received, the poster position view acquisition unit 221 stores the position information and the view information of the poster in the poster position/view information storage unit 222. At this time, the poster position view acquisition unit 221 can receive, for example, an identifier for identifying the poster together with the position information and the view information, and cause the identifier to be stored in association with the position information. Furthermore, the poster position view acquisition unit 221 may store, in association with the position information and the view information, the date and time of acquisition of the position information and the view information, for example.

(Poster Position/View Information Storage Unit 222)

The poster position/view information storage unit 222 is a storage unit for storing position information and view information of a poster. The information stored in the poster position/view information storage unit 222 may include position information, view information, an identifier of the poster, and the date and time of acquisition of the position information and the view information, as described above. Furthermore, the poster position/view information storage unit 222 is a device for storing data, and may include a storage medium, a recording device for recording data in the storage medium, a reading device for reading data from the storage medium, a deletion device for deleting data recorded in the storage medium, and the like. Here, as the storage medium, a non-volatile memory such as a flash memory, an MRAM (Magnetoresistive Random Access Memory), a FeRAM (Ferroelectric Random Access Memory), a PRAM (Phase change Random Access Memory) and an EEPROM (Electronically Erasable and Programmable Read Only Memory), a magnetic recording medium such as ah HDD (Hard Disk Drive), and the like may be used.

(Query Position View Acquisition Unit 223)

The query position view acquisition unit 223 has a function of acquiring position information and view information of a target person 6 transmitted from the user device 10b. The position information and the view information to be acquired by the query position view acquisition unit 223 here are the position information and the view information estimated by the user device 10b. Here, the position information that the query position view acquisition unit 223 acquires from the user device 10b will be referred to as query position information, and the view information that the query position view acquisition unit 223 acquires from the user device 10b will be referred to as query view information. The query position view acquisition unit 223 can supply the query position information and the query view information acquired to the matching unit 224.

(Matching Unit 224)

The matching unit 224 has a function of specifying which poster a target person queried by the user device 10b is, based on at least either of the query position information and the query view information acquired by the query position view acquisition unit 223. For example, the matching unit 224 can extract a poster by performing matching of query position information and position information stored in the poster position/view information storage unit 222. At this time, if a plurality of posters are extracted, the matching unit 224 may further perform matching with respect to view information. That is, if a plurality of posters are extracted based on position information, the matching unit 224 may specify a poster by performing matching of query view information and view information stored in the poster position/view information storage unit 222. The matching unit 224 can supply information identifying a specified poster to the notification unit 225.

(Notification Unit 225)

The notification unit 225 has a function of notifying the user device 10b of access information for accessing the public information of a poster specified by the matching unit 224. The notification unit 225 can notify the user device 10b of access information assigned with a time-limited access right with limited access time for the public information, for example. Additionally, if the number of posters specified by the matching unit 224 is not one, the notification unit 225 may have the user 5 select a specific poster from a plurality of posters. For example, the notification unit 225 can provide the characteristics of a plurality of posters extracted by the matching unit 224 to the user 5. For example, the notification unit 225 can notify the user 5 of characteristics such as "female in twenties", "male in fifties", and the like.

3-4. Example Operation

Figure 22:
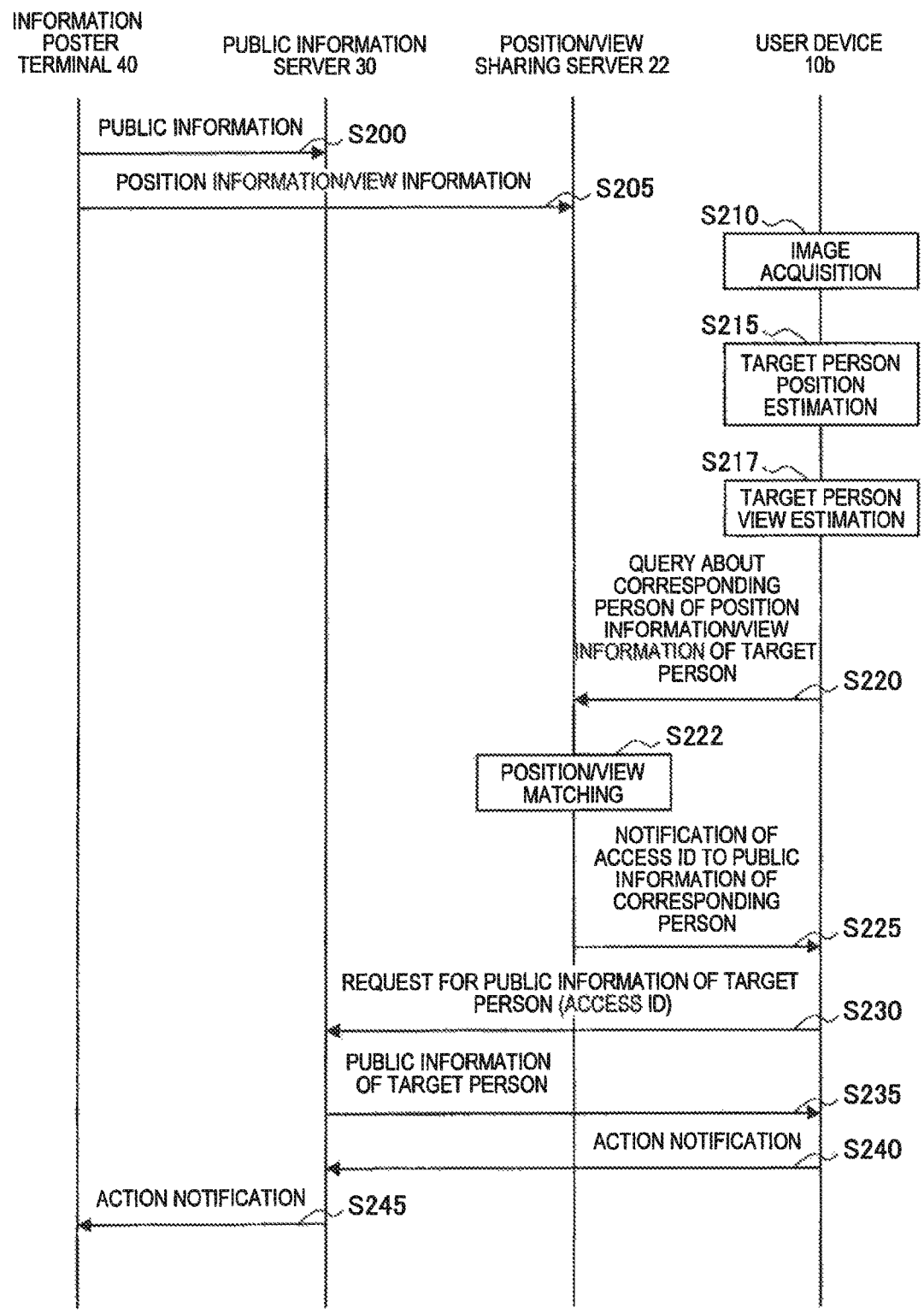
FIG. 22 is a sequence diagram showing an example operation of the communication system according to the embodiment.

Here, an example operation of the communication system 2 according to the second embodiment of the present disclosure will be described with reference to FIG. 22. FIG. 22 is a sequence diagram showing an example operation of the communication system according to the embodiment.

Referring to FIG. 22, first, the information poster terminal 40 transmits public information which has been generated to the public information server 30 (S200). Then, the information poster terminal 40 regularly transmits position information and view information to the position/view sharing server 22. At this time, as described above, the information poster terminal 40 may transmit information for identifying the poster to the position/view sharing server 22. The position/view sharing server 22, which has received the position information and the view information, causes the position information and the view information to be stored together with the identifier of the poster.

Then, when a user 5 turns the user device 10b toward the target person 6, who is the information poster, and taps the target person displayed on the display screen, the user device 10b acquires an image (S210). At this time, the image acquisition unit 101 captures a snapshot at the time of tap input, for example, and supplies the snapshot to the target position estimation unit 102. Then, the target position estimation unit 102 estimates the position of the target person (S215).

Also, the target view estimation unit 109 estimates the view of the target person 6 using the snapshot (S217). At this time, the target view estimation unit 109 generates a view image of the target person 6, and, also, may estimate the azimuth the target person 6 is facing.

Next, the access information acquisition unit 106b of the user device 10b transmits the position information of the target person 6 to the position/view sharing server 22, and performs query about a corresponding person (S220). The position/view sharing server 22 performs position/view matching process in response to this query (S222). Then, when a corresponding person is specified by this position/view matching process, the position/view sharing server 22 transmits an access ID for the public information of the corresponding person to the user device 10b (S225).

The user device 10b requests the public information server 30 for the public information of the target person 6 using the access ID acquired (S230). The public information server 30 transmits the public information of the target person 6 to the user device 10b in response to the request (S235). The display control unit 108 of the user device 10b displays the public information acquired on the display screen.

When the user 5 performs some kind of action on the public information displayed, the user device 10b notifies the public information server 30 of the performance of this action (S240). The public information server 30 can notify the information poster terminal 40 of the action (S245).

<4. Third Embodiment (Example of Information Poster Sending Out Access Information)

4-1. System Configuration

Figure 23:
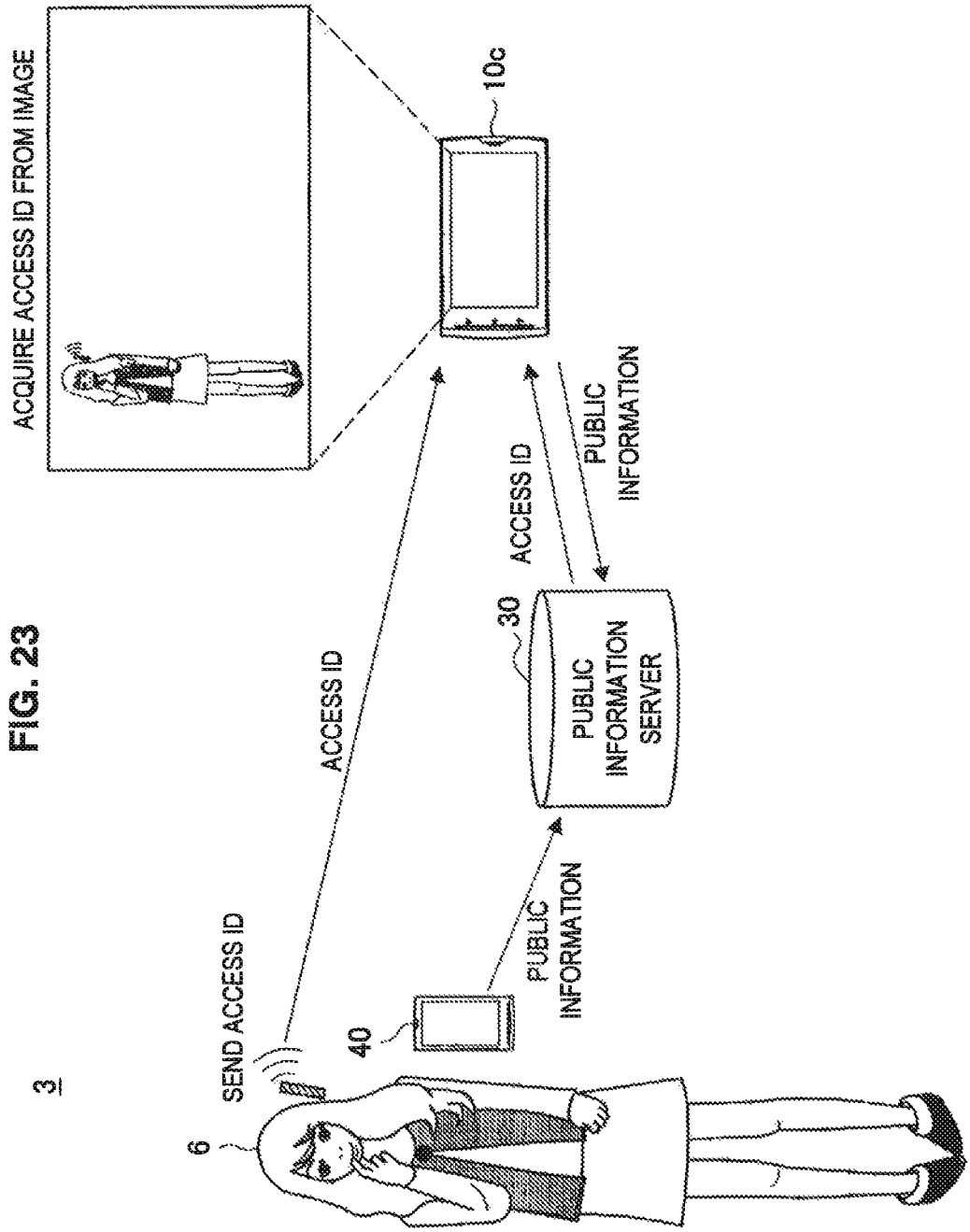
FIG. 23 is an explanatory diagram showing a configuration of a communication system according to a third embodiment of the present disclosure.

Next, a configuration of a communication system according to a third embodiment of the present disclosure will be described with reference to FIG. 23. FIG. 23 is an explanatory diagram showing a configuration of a communication system according to the third embodiment of the present disclosure.

The communication systems according to the first and second embodiments described above have a configuration where access information is acquired by specifying a poster by matching that is based on position information or the like of the target person 6. However, the present technology is not limited to such an example, and, as described here as the third embodiment, access information sent out by a poster may be directly read by a user device 10c. Here, the poster sends out the access information by using optical communication.

A communication system 3 according to the third embodiment of the present disclosure mainly includes a user device 10c held by the user 5, a public information server 30, and an information poster terminal 40. An information poster sends out an access ID for accessing his/her public information by using a flashing pattern of light. This light may be invisible light. The user device 10c can read this flashing pattern by an imaging device, and acquire the access ID.

In the following, a description will be given mainly on the differences to the first and second embodiments, and will be omitted for the same elements as the first and second embodiments by denoting the elements with the same reference numerals.

4-2. Functional Configuration of User Device

Figure 24:
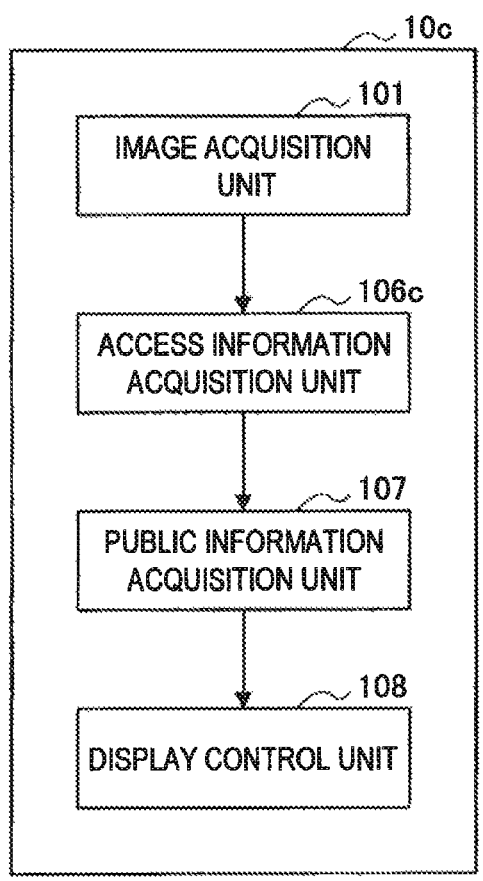
FIG. 24 is a block diagram showing a configuration of a user device according to the embodiment.

Next, a functional configuration of the user device according to the present embodiment will be described with reference to FIG. 24. FIG. 24 is a block diagram showing a configuration of the user device according to the embodiment.

((User Device 10c))

Referring to FIG. 24, the user device 10c according to the present embodiment mainly includes an image acquisition unit 101, an access information acquisition unit 106c, a public information acquisition unit 107, and a display control unit 108.

(Access Information Acquisition Unit 106c)

The access information acquisition unit 106c has a function of acquiring access information assigned with a time-limited access right to the public information associated with a target person 6 in an image acquired by the image acquisition unit 101. The access information acquisition unit 106c can read a flashing pattern of light from the image acquired by the image acquisition unit 101, and acquire an access ID indicated by the pattern. The access information acquisition unit 106c can supply the access information acquired to the public information acquisition unit 107. Additionally, this access ID is synchronized with an access ID on the public information server 30. For example, a timestamp method related to a one-time password may be used, for example.

In the foregoing, examples of functions of the user device 10c according to the present embodiment have been described. Each of the structural elements described above may be configured using a general-purpose member or circuit, or by hardware dedicated to the function of each structural element. Furthermore, the function of each structural element may be realized by an arithmetic unit such as a CPU (Central Processing Unit) reading a control program describing procedures for realizing the function from a storage medium such as a ROM (Read Only Memory) or a RAM (Random Access Memory) storing the control program, and interpreting and executing the program. This user device 10c may take the hardware configuration described in the first embodiment of the present disclosure using FIG. 9. However, the configuration to be used may be changed as appropriate according to the technical level at the time of implementation of the present embodiment.

Additionally, a computer program for realizing each function of the user device 10c according to the present embodiment as described above may be created and installed in a personal computer or the like. Also, a computer-readable recording medium in which such a computer program is stored may be provided. The recording medium is a magnetic disk, an optical disk, a magneto-optical disk, a flash memory, or the like. Furthermore, the computer program may be distributed over a network, for example, without using the recording medium.

4-3. Example Operation

Figure 25:
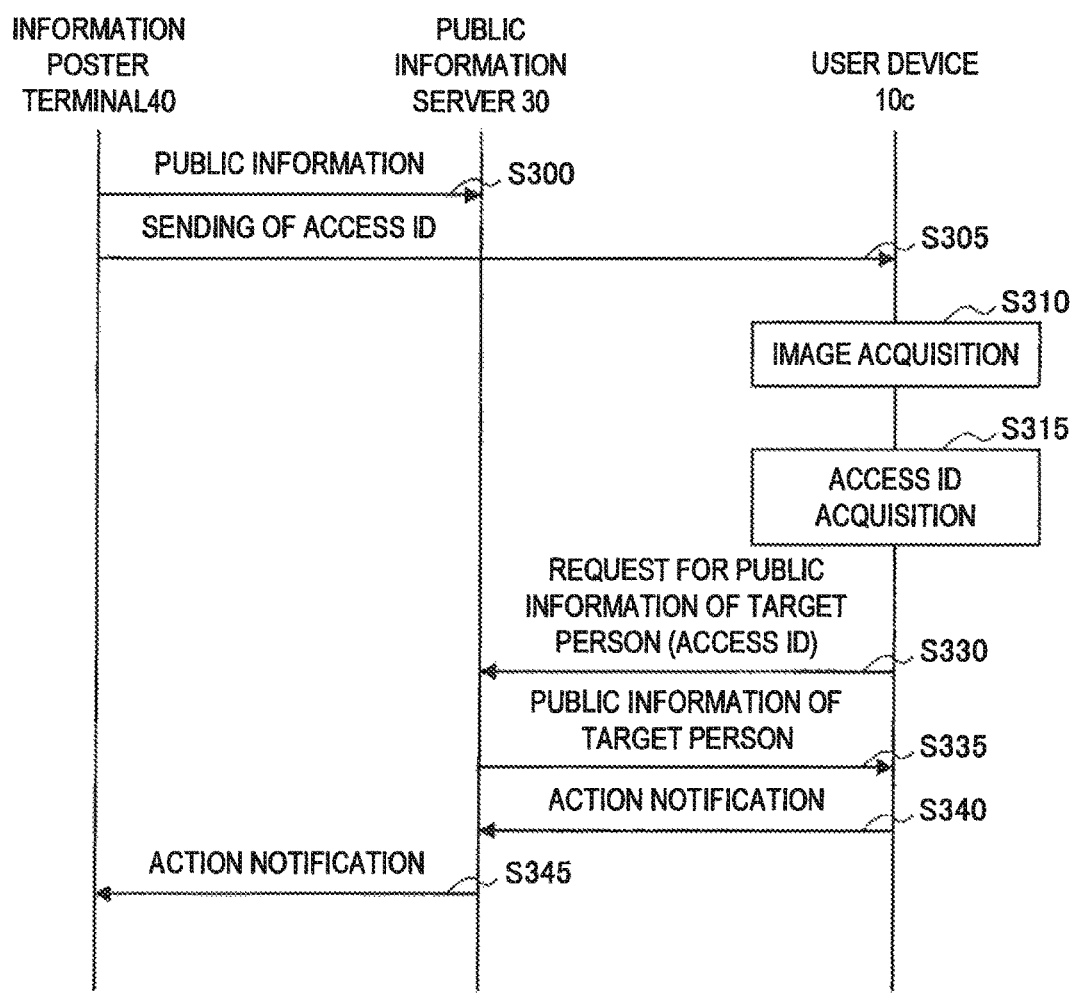
FIG. 25 is a sequence diagram showing an operation of the communication system according to the embodiment.

Here, an example operation of the communication system 3 according to the third embodiment of the present disclosure will be described with reference to FIG. 25. FIG. 25 is a sequence diagram showing an example operation of the communication system according to the embodiment.

Referring to FIG. 25, first, the information poster terminal 40 transmits public information which has been generated to the public information server 30 (S300). Then, the information poster terminal 40 sends out an access ID (S305). The information poster sends out the access ID to unspecified device(s) by using a flashing pattern of light. Here, a description is given assuming that the information poster terminal 40 sends out the access ID, but the present technology is not limited to such an example. An image sensor is turned toward the information poster while the user device 10c is in a range where the light can be received, and the image acquisition unit 101 acquires an image (S310). Then, the access information acquisition unit 106c acquires the access information by reading the same from the image acquired (S315).

Next, the user device 10c requests the public information server 30 for the public information of the target person 6 by using the access ID acquired (S330). The public information server 30 transmits the public information of the target person 6 to the user device 10c in response to the request (S335).

When the user 5 performs some kind of action on the displayed public information, the user device 10c notifies the public information server 30 of performance of this action (S340). The public information server 30 can notify the information poster terminal 40 of the action (S345).

5. Personal Information

As described above, according to the communication system according to each embodiment of the present disclosure, one can communicate with a stranger presently in front of him/her while both sides remain anonymous to each other. Here, since anonymous communication is intended, it is also important that the communication system according to each embodiment of the present disclosure appropriately manage system usage history information.

For example, history that is kept on the side of a user 5 who has performed an action on public information the user 5 has viewed may be information regarding when, where, and what of the action. Also, with respect to information regarding a target person for whom an action has been performed, whether or not an acquired image is to be kept or not may be controlled according to the setting on the side of the poster. Further, it is also possible not to allow an acquired image to be kept. Furthermore, the number of times actions have been performed may be kept as the history information.

Also, the history that is to be kept on the side of the poster may be information regarding when, where, and what of an action. Furthermore, it is desirable that information about the user 5 who has performed the action does not remain. Or, only the number of times each action has been performed may be kept.

Also, the history information to be stored by the communication system may be information about when, where, who, to whom, and what of an action. However, information about the user 5 or the target person 6 is to be used to perform control for personal information protection or to generate statistical information, and is desirably not provided to the user 5 or the poster. Furthermore, as described above, statistical information may be provided as long as an individual is not specified. For example, ranking information or the like may contribute to usage promotion.

Furthermore, in an embodiment described above, inclusion of an affiliate link in the public information is described. However, it is not desirable for the present communication system intended for anonymous communication that an individual is specified from an affiliate ID. Accordingly, for example, an affiliate ID that can be used only in the communication system of the present disclosure may be provided. Moreover, if this affiliate ID is changed every predetermined time, tracking down of an individual becomes even more difficult, resulting in protection of personal information. As an exception, when a famous person is the poster, the history information may be allowed to be kept.

6. Example of Effect

As described above, according to the communication system according to each embodiment of the present disclosure, one can communicate with a stranger presently in front of him/her while both sides remain anonymous to each other without handing over personal information. Here, by both sides remaining anonymous, communication can be expected to be performed with certain casualness. For example, by using a message input area provided in public information, one can talk to a stranger in front of him/her without both sides having to identify themselves. Also, by pressing an agree button provided in public information, that someone has paid attention to and agreed to another can be visualized. By visualizing the attention of a person, new mode of communication may be created.

Also, to specify a specific target person 6, position information or an access ID that is directly sent out is used, as described above. Thus, a photo of oneself does not have to be posted to use the service, and it is desirable from the standpoint of personal information protection.

Also, by using a donation button provided in public information, goodwill can be actualized. With such a system, donation can be made by a simple act of pressing a button. At this time, since the object of donation is the person in front, one can anonymously show goodwill while directly seeing the object of donation.

Furthermore, for example, a message input section provided in public information enables communication in a noisy place where one has difficulty making himself/herself heard. Also, if, at the same time as calling attention to clothes one is wearing, a product one possesses, music one is listening to, and the like using public information, a viewer can be lead to a link where the viewer can directly make purchase, a new business is possibly born.

It should be understood by those skilled in the art that various modifications, combinations, sub-combinations and alterations may occur depending on design requirements and other factors insofar as they are within the scope of the appended claims or the equivalents thereof.

For example, in the above embodiments, a case has been described where the user device 10 is a smartphone, but the technical scope of the present disclosure is not limited to such an example. For example, the user device 10 may be an information processing apparatus such as a personal computer (PC), a mobile phone, a personal handyphone system (PHS), a portable music player, a portable video player, a portable game console, a personal digital assistant (PDA), and the like. Also, the hardware configuration of the user device 10 described above is an example for a case where the user device 10 is a smartphone. The user device 10 may, of course, take a configuration where some of the structural elements described are omitted, or a configuration including structural elements other than those described.

Furthermore, in the above embodiments, a user 5 acquires access information to public information posted by a target person 6 by holding the user device 10 over the target person 6 and acquiring an image, and specifying the target person 6 on the display screen. However, the technical scope of the present disclosure is not limited to such an example. For example, in the case of specifying a target person 6 based on position information, as described in the first and second embodiments, first, whether a poster posting information exists in the vicinity of a user 5 may be displayed by the user device 10 by a map, a radar display, or the like.

Furthermore, in the above embodiments, public information is specified based on a target person, but the technical idea of the present disclosure is not limited to such an example. For example, the public information may be associated not with a person, but with an object.

Additionally, in the above embodiments, the functions of the user device 10 are realized by one device, but the technical scope of the present disclosure is not limited to such an example. For example, the functions of the user device 10 may be realized by two or more devices operating in conjunction. For example, a head-mounted display (HMD) device may be used in conjunction with the user device 10. For example, specification of a target person 6 may be performed at the HMD. In this case, if a state where attention lasts for a predetermined time or more, a person existing at an area to which attention is paid may be specified as the target person 6. Or, a target person 6 may be specified by a sign of shutting one eye (a so-called wink). Also, public information may be displayed on the display of the HMD, for example. An action operation for the public information displayed on the HMD may be performed at the HMD, for example. Or, the action operation for the public information displayed on the HMD may be performed at another device such as the user device 10. At this time, for the conjunction between the user device 10 and the HMD, it is desirable that the users 5 are authenticated as being the same based on the user IDs, for example. Or, the user device 10 may cause public information to be displayed only on an HMD to which connection via near field communication is possible.

For example, examples of the functions of the position sharing server 20, the position/view sharing server 22, and the public information server 30 have been described above as examples for realizing the technical idea of the present disclosure. Each of the structural elements described above may be configured using a general-purpose member or circuit, or by hardware dedicated to the function of each structural element. Furthermore, the function of each structural element may be realized by an arithmetic unit such as a CPU (Central Processing Unit) reading a control program describing procedures for realizing the function from a storage medium such as a ROM (Read Only Memory) or a RAM (Random Access Memory) storing the control program, and interpreting and executing the program.

Furthermore, in the above embodiments, a terminal that sends out position of a poster, a terminal that generates public information, and a terminal that receives an action notification are assumed to be one information poster terminal 40, but the present technology is not limited to such an example. The terminal that sends out position of a poster, the terminal that generates public information, and the terminal that receives an action notification may be separate devices. Also, the terminal that sends out position of a poster, the terminal that generates public information, and the terminal that receives an action notification may be partly separate. For example, the terminal that sends out position of a poster may be a mobile device, such as a smartphone. Also, the terminal that generates public information and the terminal that receives an action notification do not have to be a mobile device. For example, the terminal that generates public information and the terminal that receives an action notification may be a personal computer (PC).

Additionally, the steps described in the sequence diagrams in the present specification include, of course, processes performed chronologically according to the order described, and also processes that are performed in parallel or individually without being performed chronologically. Also, it is needless to say that the order may be changed as appropriate for steps that are chronologically processed.

Additionally, the following configurations are also within the technical scope of the present disclosure.

(1)

An information processing apparatus including:

an image acquisition unit for acquiring an image that includes a target a user is paying attention to;

an access information acquisition unit for acquiring access information assigned with a time-limited access right to public information that is associated with the target in the image;

a public information acquisition unit for acquiring the public information using the access information; and a display control unit for controlling display of the public information.

(2)

The information processing apparatus according to (1), wherein the public information includes a reception area for receiving an action from the user.

(3)

The information processing apparatus according to (1) or (2), wherein the public information acquisition unit acquires the public information that is selected based on a type of the public information.

(4)

The information processing apparatus according to any of (1) to (3), wherein the public information acquisition unit acquires the public information that is selected based on an attribute of a poster of the public information.

(5)

The information processing apparatus according to any of (1) to (4), wherein the public information acquisition unit acquires the public information that is selected based on a distance to the target.

(6)

The information processing apparatus according to any of (1) to (5), further including:

a position estimation unit for estimating a position of the target, wherein the access information acquisition unit acquires the access information that is associated with the target specified based on the estimated position.

(7)

The information processing apparatus according to (6), further including:

a view estimation unit for estimating a view of the target, wherein the access information acquisition unit acquires the access information that is associated with the target specified based further on the estimated view.

(8)

The information processing apparatus according to any of (1) to (7), wherein the display control unit causes a head-mounted display device that is associated with the information processing apparatus to display the public information.

(9)

The information processing apparatus according to (1), wherein the access information acquisition unit acquires a flashing pattern of light sent out by the target, and acquires the access information based on the flashing pattern.

(10)

The information processing apparatus according to (2), wherein the reception area includes a button for the user to make a donation.

(11)

The information processing apparatus according to (2), wherein the reception area includes an input section for a comment to be sent to a poster of the public information.

(12)
The information processing apparatus according to (2),
wherein the action received via the reception area is transmitted to a public information providing server that provides the public information, and
wherein the action transmitted to the public information providing server is notified to a poster of the public information after a predetermined condition is satisfied.
(13)
The information processing apparatus according to (12), wherein the predetermined condition is a predetermined lapse of time after reception of the action.
(14)
The information processing apparatus according to (12), wherein the predetermined condition is separation of the user and the poster of the public information by a predetermined distance.
(15)
The information processing apparatus according to any of (1) to (14), wherein the public information includes an affiliate link.
(16)
An information processing method including:
acquiring an image that includes a target a user is paying attention to;
acquiring access information assigned with a time-limited access right to public information that is associated with the target in the image;
acquiring the public information using the access information; and
controlling display of the public information.
(17)
A program for causing a computer to function as an information processing apparatus including:
an image acquisition unit for acquiring an image that includes a target a user is paying attention to;
an access information acquisition unit for acquiring access information assigned with a time-limited access right to public information that is associated with the target in the image;
a public information acquisition unit for acquiring the public information using the access information; and
a display control unit for controlling display of the public information.
(18)
A computer-readable recording medium storing a program for causing a computer to function as an information processing apparatus including:
an image acquisition unit for acquiring an image that includes a target a user is paying attention to;
an access information acquisition unit for acquiring access information assigned with a time-limited access right to public information that is associated with the target in the image;
a public information acquisition unit for acquiring the public information using the access information; and
a display control unit for controlling display of the public information.
(19)
An information processing system including:
an information processing apparatus including
an image acquisition unit for acquiring an image that includes a target a user is paying attention to,
an access information acquisition unit for acquiring access information assigned with a time-limited access right to public information that is associated with the target in the image,
a public information acquisition unit for acquiring the public information using the access information, and
a display control unit for controlling display of the public information;
a position sharing server for providing the information processing apparatus with the access information to the public information that is associated with the target specified based on position information; and
a public information providing server for providing the public information in response to an access from the user who has the time-limited access right.
(20)
The information processing system according to (19),
wherein the public information includes a reception area for receiving an action from the user, and
wherein, when the action is received from the user, the public information providing server notifies a poster of the public information of reception of the action after a predetermined condition is satisfied.

What is claimed is:
1. A server for sharing first-person view images, the server comprising:
circuitry configured to:
store image data that is uploaded in real-time by a plurality of information posters and includes a first-person view image of each information poster of the plurality of information posters, the first-person view image being seen from a position of the information poster;
receive selecting information, which is input by a user of a mobile terminal, to select a human image by selecting a part of a displayed image on the mobile terminal, wherein the displayed image is captured by an imaging device of the mobile terminal;
determine whether the stored image data includes a first-person view image corresponding to the selected human image; and
send, based on a determination that the stored image data includes the first-person view image corresponding to the selected human image, to the mobile terminal the first-person view image corresponding to the selected human image.
2. The server according to claim 1,
wherein the circuitry is further configured to notify the user of characteristics of each information poster of the plurality of information posters in a case when the selected human image corresponds to the plurality of information posters.
3. The server according to claim 2,
wherein the characteristics of each information poster of the plurality of information posters include at least one of age and gender.
4. The server according to claim 1,
wherein the circuitry is configured to store history data on an access by the user to the stored image data.
5. The server according to claim 4,
wherein the circuitry is configured to send at least part of the stored history data to an information terminal of the information poster.
6. The server according to claim 4,
wherein the circuitry is configured to provide ranking information on accesses by the plurality of users to the stored image data.
7. The server according to claim 1,
wherein the displayed image corresponds to a space which the mobile terminal is turned toward.

8. The server according to claim 7,
wherein the mobile terminal comprises a head mounted display.

9. The server according to claim 1,
wherein the circuitry is configured to control, in accordance with a setting set by each information poster, whether to allow the stored image data uploaded by the information poster to be kept in the mobile terminal of the user.

10. The server according to claim 1,
wherein the stored image data uploaded in real-time by each information poster is associated with an affiliate link.

11. An information processing method for sharing first-person view images, implemented via at least one processor, the method comprising:
sending, to a server, selecting information of a human image in accordance with a part of a displayed image that is selected by a user of a mobile terminal, wherein the displayed image is captured by an imaging device of the mobile terminal and corresponds to at least one selected information poster of a plurality of information posters; and
receiving stored image data uploaded in real-time by the at least one selected information poster from the server with the mobile terminal,
wherein the stored image data that is uploaded in real-time by the at least one selected information poster includes a first-person view image of each information poster of the at least one selected information poster, and
wherein the first-person view image of each information poster is seen from a position of the information poster.

12. A non-transitory computer-readable medium having embodied thereon a program, which when executed by a display device, causes the display device to execute a method for sharing first-person view images, the method comprising:
sending, to a server, selecting information of a human image in accordance with a part of a displayed image that is selected by a user of a mobile terminal, wherein the displayed image is captured by an imaging device of the mobile terminal and corresponds to at least one selected information poster of a plurality of information posters; and
receiving stored image data uploaded in real-time by the at least one selected information poster from the server with the mobile terminal,
wherein the stored image data that is uploaded in real-time by the at least one selected information poster includes a first-person view image of each information poster of the at least one selected information poster, and
wherein the first-person view image of each information poster is seen from a position of the information poster.

* * * * *